United States Patent
Soltys et al.

(10) Patent No.: US 6,517,436 B2
(45) Date of Patent: Feb. 11, 2003

(54) METHOD AND APPARATUS FOR MONITORING CASINOS AND GAMING

(75) Inventors: Richard Soltys, Kirkland, WA (US); Richard Huizinga, Bellevue, WA (US)

(73) Assignee: MindPlay LLC, Bellevue, WA (US)

( * ) Notice: Subject to any disclaimer, the term of this patent is extended or adjusted under 35 U.S.C. 154(b) by 0 days.

(21) Appl. No.: 10/015,515

(22) Filed: Dec. 13, 2001

(65) Prior Publication Data

US 2002/0049085 A1 Apr. 25, 2002

Related U.S. Application Data

(62) Division of application No. 09/474,858, filed on Dec. 30, 1999.
(60) Provisional application No. 60/130,368, filed on Apr. 21, 1999.

(51) Int. Cl.$^7$ .................................................. A63F 9/24
(52) U.S. Cl. .................. 463/29; 348/143; 348/159; 273/148 R; 273/309
(58) Field of Search ............................ 463/25, 29, 30; 348/143, 151, 152, 153, 154, 155, 159

(56) References Cited

U.S. PATENT DOCUMENTS

| | | | |
|---|---|---|---|
| 3,787,660 A | 1/1974 | Meyers et al. ......... 235/61.9 R |
| 4,108,361 A | 8/1978 | Krause ........................ 235/375 |
| 4,135,663 A | 1/1979 | Nojiri et al. ................ 235/463 |
| 4,467,424 A * | 8/1984 | Hedges et al. | |
| 4,531,187 A | 7/1985 | Uhland ........................ 364/412 |
| 4,534,562 A | 8/1985 | Cuff et al. ............... 273/149 P |
| 4,662,637 A | 5/1987 | Pfeiffer ................... 273/149 P |
| 4,667,959 A | 5/1987 | Pfeiffer et al. .......... 273/149 R |
| 4,750,743 A | 6/1988 | Nicoletti ................. 273/148 A |
| 4,814,589 A | 3/1989 | Storch et al. ............... 235/375 |
| 4,822,050 A | 4/1989 | Normand et al. ........ 273/149 P |
| 4,951,950 A | 8/1990 | Normand et al. ........ 273/149 P |
| 5,067,713 A | 11/1991 | Soules et al. ............ 273/149 P |
| 5,103,081 A | 4/1992 | Fisher et al. ................ 235/464 |
| 5,114,153 A | 5/1992 | Rosenwinkel et al. ...... 273/292 |
| 5,121,921 A | 6/1992 | Friedman et al. ........ 273/149 P |
| 5,186,464 A | 2/1993 | Lamle .................... 273/149 R |
| 5,199,710 A | 4/1993 | Lamle .................... 273/149 R |

(List continued on next page.)

FOREIGN PATENT DOCUMENTS

| | | |
|---|---|---|
| DE | 44 39 502 | 9/1995 |
| WO | WO 96/36253 | 11/1996 |

OTHER PUBLICATIONS

Soltys, Richard J. et al., U.S. patent application No. 09/849,456, filed May 4, 2001, entitled "Method, Apparatus and Article for Verifying Card Games, Such as Blackjack."

Soltys, Richard et al., U.S. Patent application No. 09/790,480 filed, Feb. 21, 2001, entitled "Method, Apparatus and Article for Evaluating Card Games, Such as Blackjack."

*Primary Examiner*—Michael O'Neill
(74) *Attorney, Agent, or Firm*—Seed IP Law Group PLLC

(57) ABSTRACT

A system automatically monitors playing and wagering of a game. A table monitor in a chip tray automatically images the activity occurring at a gaming table. Periodic comparison of the images identify wagering, as well as the appearance, removal and position of cards and other game objects on the gaming table. The chip tray may also include a chip tray reader that automatically images the contents of a chip tray, to periodically determine the number and value of chips in the chip tray, and to compare the change in contents of the chip tray to the outcome of game play for verifying that the proper amounts have been paid out and collected. The system can produce measurements relevant to providing automated security, real-time accounting and a basis for automatically allocating complimentary player benefits.

18 Claims, 28 Drawing Sheets

U.S. PATENT DOCUMENTS

| | | | |
|---|---|---|---|
| 5,283,422 A | 2/1994 | Storch et al. | 235/375 |
| 5,319,181 A | 6/1994 | Shellhammer et al. | 235/462 |
| 5,343,028 A | 8/1994 | Figarella et al. | 235/462 |
| 5,374,061 A | 12/1994 | Albrecht | 273/149 R |
| 5,397,133 A | 3/1995 | Penzias | 273/439 |
| 5,431,399 A | 7/1995 | Kelley | 273/149 P |
| 5,548,110 A | 8/1996 | Storch et al. | 235/472 |
| 5,586,936 A | 12/1996 | Bennett et al. | 463/25 |
| 5,605,334 A | 2/1997 | McCrea, Jr. | 273/309 |
| 5,613,680 A | 3/1997 | Groves et al. | 273/138.2 |
| 5,613,912 A | 3/1997 | Slater | 463/25 |
| 5,645,486 A | 7/1997 | Nagao et al. | 463/27 |
| 5,651,548 A | 7/1997 | French et al. | 273/309 |
| 5,669,816 A | 9/1997 | Garczynski et al. | 463/12 |
| 5,698,839 A | 12/1997 | Jagielinski et al. | 235/493 |
| 5,722,893 A | 3/1998 | Hill et al. | 463/47 |
| 5,735,525 A | 4/1998 | McCrea, Jr. | 273/309 |
| 5,735,742 A | 4/1998 | French | 463/25 |
| 5,755,618 A | 5/1998 | Mothwurf | 453/17 |
| 5,757,876 A | 5/1998 | Dam et al. | 377/7 |
| 5,770,533 A | 6/1998 | Franchi | 463/42 |
| 5,779,546 A | 7/1998 | Meissner et al. | 463/25 |
| 5,780,831 A | 7/1998 | Sei et al. | 235/462 |
| 5,781,647 A * | 7/1998 | Fishbine et al. | |
| 5,785,321 A | 7/1998 | van Putten et al. | 273/309 |
| 5,788,574 A | 8/1998 | Ornstein et al. | 463/25 |
| 5,801,766 A | 9/1998 | Alden | 348/157 |
| 5,803,808 A | 9/1998 | Strisower | 463/11 |
| 5,809,482 A | 9/1998 | Strisower | 705/30 |
| 5,895,321 A | 4/1999 | Gassies et al. | 463/29 |
| 5,909,876 A | 6/1999 | Brown | 273/309 |
| 5,911,626 A | 6/1999 | McCrea, Jr. | 463/27 |
| 5,919,090 A * | 7/1999 | Mothwurf | |
| 5,941,769 A | 8/1999 | Order | 463/12 |
| 5,989,122 A | 11/1999 | Roblejo | 463/22 |
| 6,039,650 A | 3/2000 | Hill | 463/47 |
| 6,126,166 A | 10/2000 | Lorson et al. | 273/148 R |
| 6,166,763 A * | 12/2000 | Rhodes et al. | |
| 6,200,218 B1 | 3/2001 | Lindsay | 463/25 |
| 6,299,536 B1 | 10/2001 | Hill | 463/47 |
| 6,313,871 B1 | 11/2001 | Schubert | 348/143 |
| 6,425,817 B1 * | 7/2002 | Momemy | |

* cited by examiner

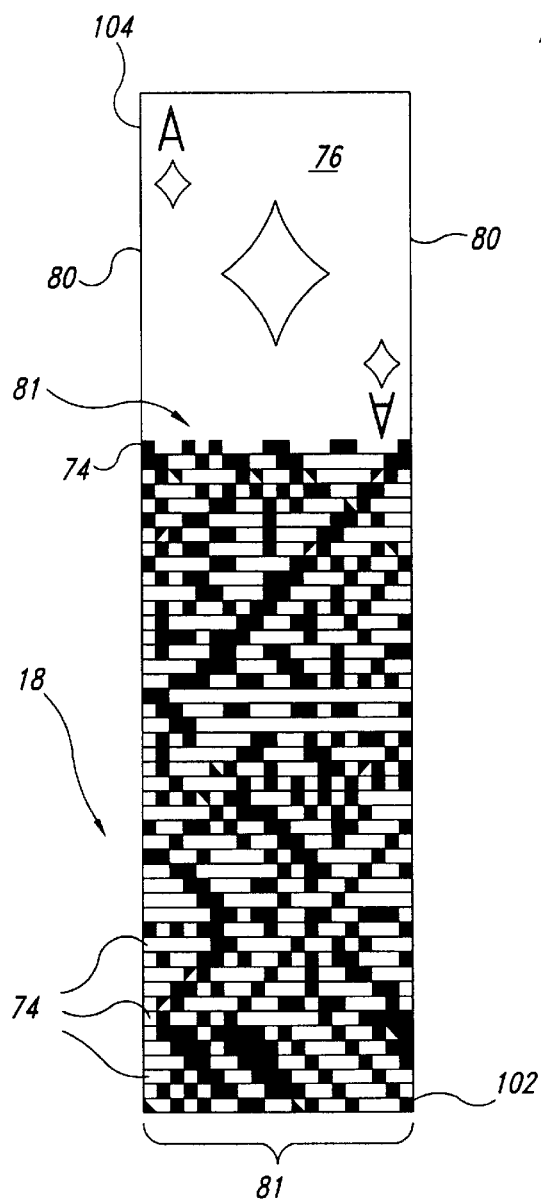 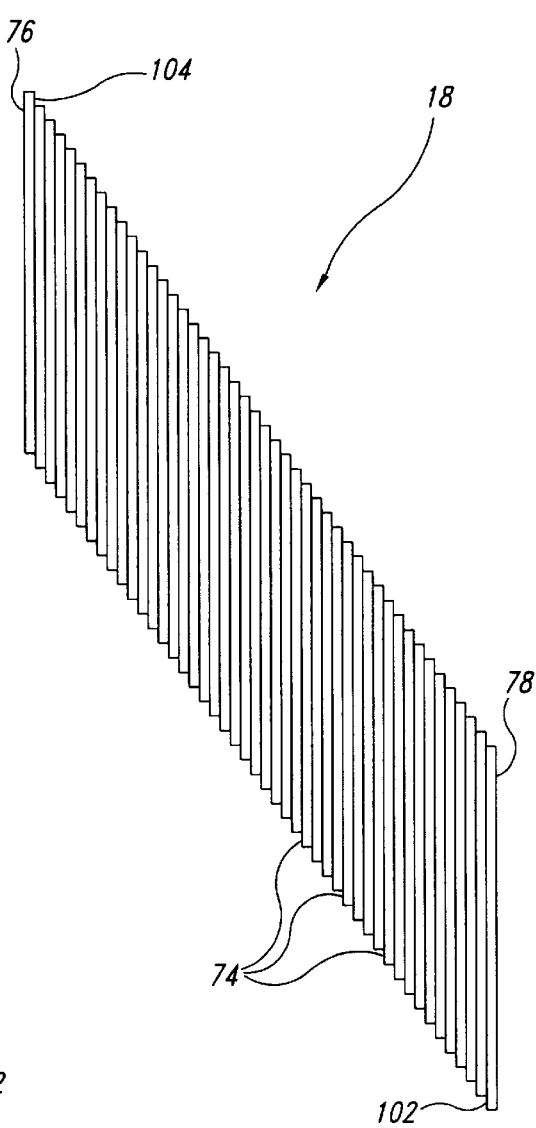
*Fig. 5*      *Fig. 6*

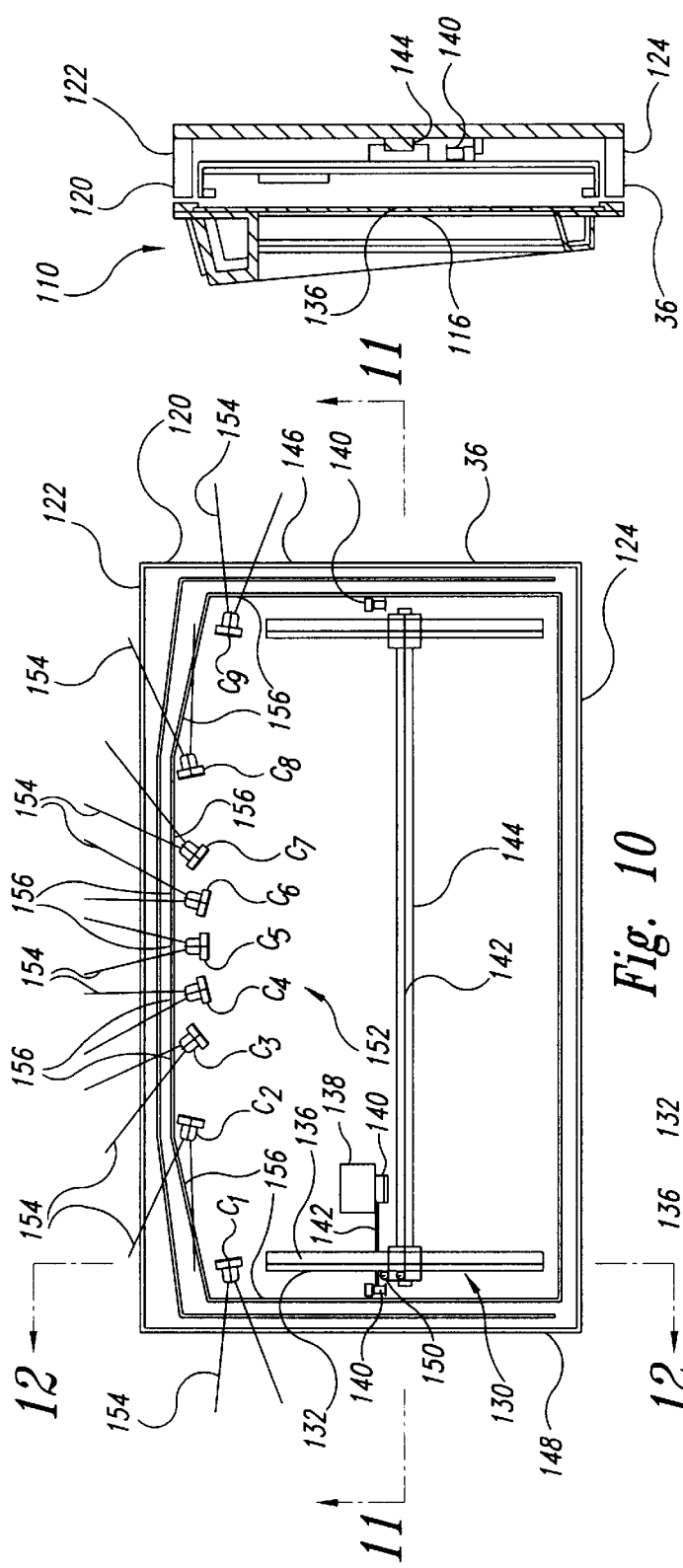
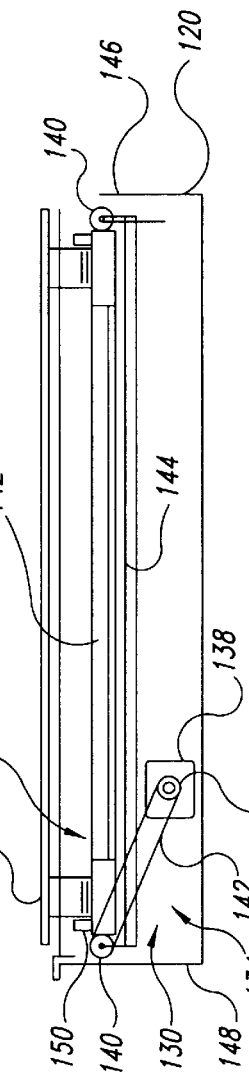
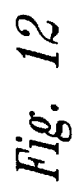
Fig. 10
Fig. 11
Fig. 12

METHOD AND APPARATUS FOR MONITORING CASINOS AND GAMING

BACKGROUND OF THE INVENTION

1. Field of the Invention

The present description generally relates to monitoring various aspects of casinos and gaming, and more specifically relates to automated game and wager tracking and analysis.

2. Description of the Related Art

Casinos and other forms of gaming are a multi-billion dollar, world-wide industry. Typically, a customer exchanges currency or some form of credit for a casino's chips. The customer places the chips as wagers at various games, such as blackjack, craps, roulette, and baccarat. A game operator, such as a dealer, pays out winning wagers with additional chips based on the set of odds for the particular game. The dealer collects the customer's chips for losing wagers. The odds of each game slightly favor the casino, so on average the casino wins and is profitable.

Like many businesses, casinos wish to understand the habits of their customers. Some casinos have employees visually observe customer's game play, manually tracking the gaming and wagering habits of the particular customers. The information allows the casinos to select the number of different games that the casino will provide and to adequately staff those games. The information also allows the casinos to select certain customers to receive complimentary benefits ("comps") and to determine the amount of comps a particular customer is to receive. The act of giving comps to a customer, commonly referred to as "comping," produces a large amount of good will with the customers, encouraging customer loyalty and further wagering. Some casinos have attempted to partially automate the tracking process, reading a customer "comp" card to identify the customer. The actual gaming and wagering patterns of the customers are visually observed by casino personnel and manually entered into a computer to create a digitized copy of the customer's gaming habits.

Similarly, casinos wish to track the efficiency of the casino and the casino's employees. Such information allows the casino to make change to increase the overall efficiency of the casino and of the employees, benefiting both the casino and customers. A typical method of tracking employee efficiency is to manually count the number of hands of blackjack dealt by a dealer over some time period. A change in an amount in a bank at the gaming table can also be manually determined and combined with the count of the number of hands to determine a won/loss percentage for the dealer. The casino can use the information to take appropriate action, such as rewarding an efficient dealer, or providing additional training to an inefficient dealer.

The fast pace and large sums of money make casinos likely targets for cheating and stealing. Casinos employ a variety of security measures to discourage cheating or stealing by both customers and employees. For example, surveillance cameras covering a gaming area or particular gaming table provide a live or taped video signal that security personnel can closely examine. Additionally, or alternatively, "pit managers" can visually monitor the live play of a game at the gaming table.

While some aspects of a casino's security system should be plainly visible as a deterrent, other aspects of the security should be unobtrusive to avoid detracting from the players' enjoyment of the game and to prevent cheaters and thieves from avoiding detection.

The current methods of tracking have several drawbacks. The methods typically depend on manual observation of a gaming table. Thus coverage is not comprehensive, and is limited to tracking a relatively small number of games, customer's and employees. This problem is exacerbated by a customer's ability to rapidly move between gaming tables. A commonly known method for cheating customers to avoid detection is to switch tables frequently. The tracking methods are also prone to error since the manual methods rely on human observers who can become inattentive or distracted. In one commonly known method of cheating the casino, one member of a team will create a distraction while another member steals chips or swaps cards. These manual tracking methods are also labor intensive, and thus costly.

SUMMARY OF THE INVENTION

In one aspect, the invention includes a system for automatically monitoring playing and wagering of a game. In one illustrated embodiment, the system includes a card deck reader that automatically reads a respective symbol from each card in a deck of cards before a first one of the cards is removed from the deck. The symbol identifies a value of the card in terms of rank and suit, and can take the form of a machine-readable symbol, such as a bar code, area or matrix code or stacked code. In another aspect, the system does not decode the read symbol until the respective card is dealt, to ensure security.

In another aspect, the system can include a chip tray reader that automatically images the contents of a chip tray. The system periodically determines the number and value of chips in the chip tray from the image, and compares the change in contents of the chip tray to the outcome of game play to verify that the proper amounts have been paid out and collected.

In a further aspect, the system can include a table monitor that automatically images the activity or events occurring at a gaming table. The system periodically compares images of the gaming table to identify wagering, as well as the appearance, removal and position of cards and/or other objects on the gaming table. The table monitoring system can be unobtrusively located in the chip tray.

In yet a further aspect, the invention includes a drop box that automatically verifies an amount and authenticity of a deposit and reconciles the deposit with a change in the contents of the chip tray. The drop box can image different portions of the deposited item, selecting appropriate lighting and resolutions to examine security features in the deposited item.

In another aspect, the system can employ some, or all of the components to monitor the gaming habits of players and the performance of employees. The system can detect suspect playing and wagering patterns that may be prohibited. The system can also identify the win/loss percentage of the players and the dealer, as well as a number of other statistically relevant measures. Such measures can provide a casino or other gaming establishment with enhanced automated security, and automated real-time accounting. The measures can additionally provide a basis for automatically allocating complimentary benefits to the players.

BRIEF DESCRIPTION OF THE DRAWINGS

FIG. 5 is a front plan view of the faces of the deck of playing cards shown in FIG. 4, staggered to expose an edge of each of the cards in the deck.

FIG. 6 is a right side elevational view of the staggered deck of playing cards of FIG. 5.

FIG. 10 is a top plan view of a chip tray monitoring subsystem used in the chip tray of FIG. 9.

FIG. 11 is a cross-sectional view taken along the section line 11—11 of FIG. 10.

FIG. 12 is a cross-sectional view taken along the section line 12—12 of FIG. 10.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with computers, computer networks, readers and machine-vision have not been shown or described in detail to avoid unnecessarily obscuring descriptions of the embodiments of the invention.

The headings provided herein are for convenience only and do not interpret the scope or meaning of the claimed invention.

This description initially presents a general explanation of gaming and gaming table monitoring components in the environment of a blackjack table. A more specific description of each of the individual hardware components and the interaction of the hardware components follows. A description of the overall operation of the system follows the hardware discussion. A more specific discussion of the operation of the system follows, presented in terms of discrete software modules. The presentation concludes with a discussion of a network of gaming tables.

Blackjack Gaming

Figure 1:
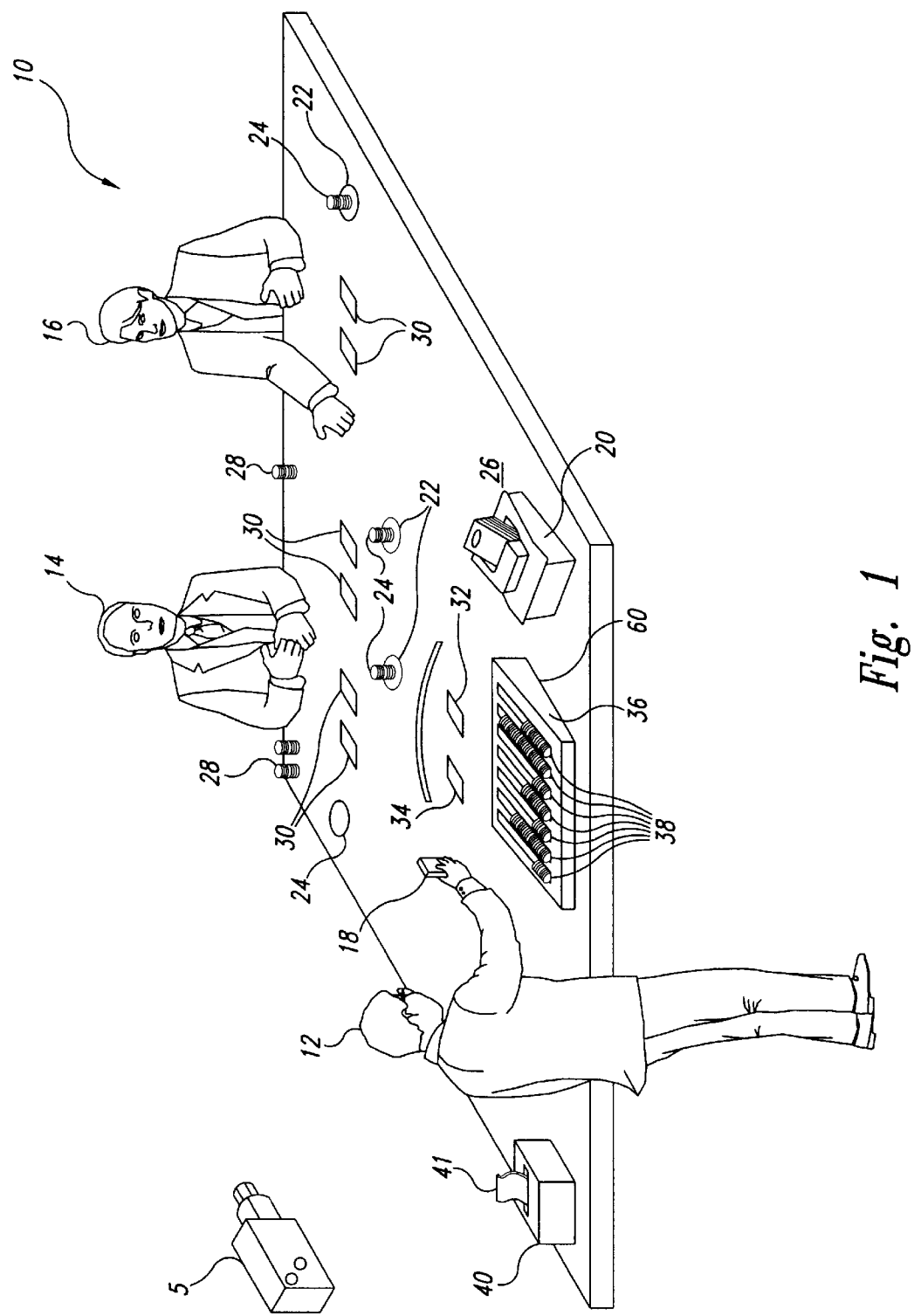
FIG. 1 is a isometric view of a game played at a gaming table by a dealer and players utilizing the present invention.

FIG. 1 shows a game of blackjack being played at a gaming table 10 by a game operator or dealer 12 employed by a gaming house or casino and customers or players 14, 16. While blackjack is used as an example, the teachings herein are generally applicable to a variety of wagering games, such as craps, baccarat, poker, wheel of fortune, and roulette to name only a few.

During a game, the dealer 12 removes cards 19 from a card shoe 20. The dealer 12 can individually draw the cards from the card shoe 20, or can remove an entire deck 18 of cards 19 from the card shoe 20 to deal by hand. Many players 14, 16 appreciate the experience of a game where the cards are dealt from a deck 18 held by the dealer 12, rather than being individually drawn from the card shoe 20.

The players 14, 16 place their respective wagers by placing a number of wager chips 22 in wager circles 24 demarcated on a playing surface 26 of the gaming table 10. The chips 22 typically come in a variety of denominations, as is explained in detail below. Players 14, 16 are issued chips in exchange for currency or credit by the casino's tellers. Casino's typically require the use of chips 22 for wagering, rather than actual currency. A player 14 can chose to play multiple hands by placing more than one wager, as shown in FIG. 1. The players 14, 16 will often have a reserve of chips 28 from which to place wagers.

After the players 14, 16 have placed an initial wager of chips 22 in their respective wager circles 24, the dealer 12 deals each player two cards 30 face down, and deals herself one card 32 face down ("hole card") 32 and one card 34 face up ("show card") from the deck 18. The players 14, 16 can accept additional cards ("hits") from the deck 18 as they attempt to reach a total card value of "21" without going over, where face cards count as ten points, and Aces can count as either one or eleven points, at the cardholder's option. The dealer 12 also attempts to reach "21" without going over, although the rules typically require the dealer 12 to take a hit when holding a "soft 17." The players 14, 16 can vary their wagers (chips 22) after the initial cards 30–34 are dealt based on their knowledge of their own hand and the dealer's face up card 34. For example, the player 14, 16 can "hit" or "stand" and may "double down" or "buy insurance."

At the end of a "hand" or game, the dealer 12 collects the wager chips 22 from losing players and pays out winnings in chips to the winning players. The winnings are calculated as a multiple of a set of odds for the game and the amount of the wager chips 22. The losses are typically the amount of the wager chips 22. The dealer 12 places the collected wager chips 22 or "take" from the losing players into a gaming table bank that takes the form of a chip tray 36. The dealer 12 pays out the winnings using the required number of chips 38 from the chip tray 36. The chip tray 36 generally consists of a number of wells, sized to receive the chips 38 with different wells generally used to contain different value chips. Changes to the contents of the chip tray 36 represent the winnings and loses of the casino ("house") at the gaming table 10. Thus, maintaining an accurate count of the number and value of the chips 38 in the chip tray 36 can assist the casino in managing its operations. Many casinos permit the dealer 12 to exchange chips for items 41 of value such as currency or other items at the gaming table 10. The dealer 12 deposits the item 41 of value into a drop box 40 at or near the gaming table 10. Periodically, for example at the end of a dealer's shift, the contents of the drop box 40 must be reconciled with contents of the chip tray 36, to ascertain that the correct number and value of chips were distributed.

Chips

Figure 2:
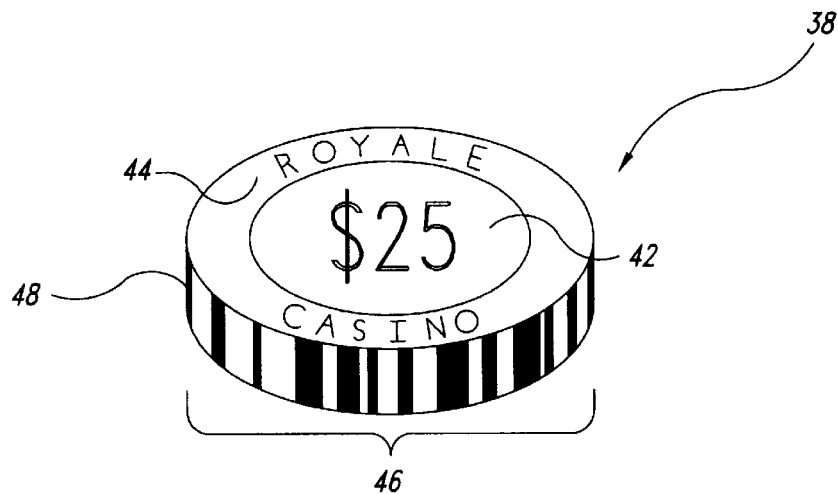
FIG. 2 is an isometric view of a casino chip of the present invention.

With reference to FIG. 2, the chips 38 are typically formed as circular disks in a variety of denominations, the value of the chip being represented by the color of the chip and by a numeric marking 42 on a face of the chip 38. The chips 38 also typically include an indication 44 of the issuing casino. The chips 38 can include a marking 46 on an edge 48 of the chip 38 encoding information such as the issuing casino, the denomination, and/or a unique serial number. The markings 46 comprise machine-readable symbols, such as bar code, area or matrix codes or stacked codes. While visually shown in FIG. 2, the markings 46 can be printed using an ink that is not typically visible to humans, such as an ink that is only visible in the infrared portion of the electromagnetic spectrum. Machine-readable symbols to which the invention is applicable and in which the invention may be embodied, may be defined by or have properties that are optically, magnetically, electrically, electro-magnetically, mechanically, etc., contrasting, distinguishable, detectable, etc. To simplify further description, bar codes having optically contrasting stripes will be used with the understanding, however, that the invention is applicable to machine-readable symbols other than the illustrated optical and other than contrasting stripes. U.S. Pat. No. 5,782,647 to Fishbine et al.; U.S. Pat. No. 5,103,081 to Fisher et al; U.S. Pat. No. 5,548,110 to Storch et al.; and U.S. Pat. No. 4,814,589 to Storch et al. disclose systems for encoding information on chips and for determining information encoded in the color, geometry, size or patterns on a chip.

System Overview

Figure 3:
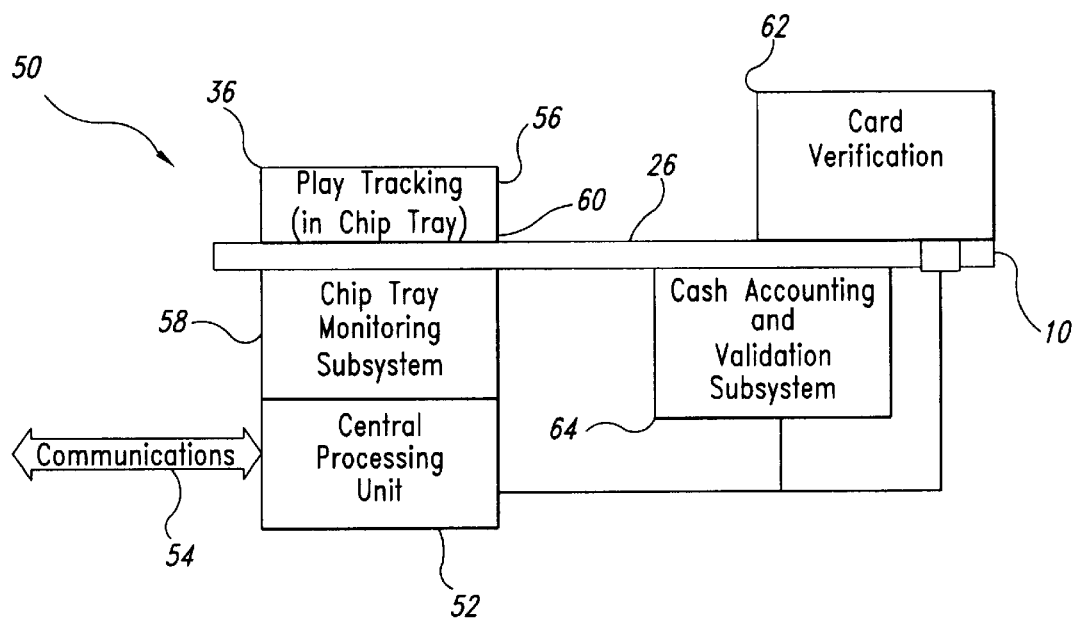
FIG. 3 is a block diagram of a monitoring system of the present invention for monitoring the gaming table of FIG. 1.

As shown in FIG. 3, a monitoring system 50 is provided for tracking the wagering and play at a gaming table, such as the blackjack gaming table 10. The monitoring system 50 includes a number of component subsystems coupled together by a central processing unit ("CPU") 52 for the gaming table 10. The gaming table CPU 52 can take the form of a programmed general purpose computer, and/or a specialized dedicated processor card. The gaming table CPU 52, typically includes a processor, memory, multiplex ("Mux") card, video and Ethernet cards, power supply and an image acquisition card. While FIG. 3 shows a single centralized gaming table CPU 52, the monitoring system 50 can take a more distributed approach, locating dedicated processors in one or more of the individual system components. Alternatively, a common CPU could service a number of gaming tables, each of the gaming tables having a set of individual component subsystems. The gaming table CPU 52 communicates with external computers and devices over a communications link 54 such as a local area network ("LAN") and/or a wide area network ("WAN"). The communications link 54 can be wired and/or wireless. The communications link can employ Internet, or World Wide Web communications protocols, and can take the form of a proprietary extranet.

A play tracking subsystem 56 visually monitors activity on the playing surface 26 of the gaming table 10. The play tracking subsystem 56 is located in the chip tray 36, above the playing surface 26 of the gaming table 10. A chip tray monitoring subsystem 58 monitors the contents of the chip tray 36. The chip tray monitoring subsystem 58 can be located in the chip tray 36. The playing surface 26 has an opening 60 for receiving a lower portion of the chip tray 36, such that the chip tray monitoring subsystem 58 is positioned below the playing surface 26, although such positioning is not necessary to the function of the component subsystem. A card verification subsystem 62 identifies each of the cards in the card deck 18. The card verification subsystem 62 is located in the card shoe 20 (FIG. 1) on the playing surface 26 of the gaming table 10. A cash accounting and validation subsystem 64 monitors the contents of the drop box 40 (FIG. 1). These subsystems 56, 58, 62, 64 are each described in detail below.

Card Shoe/Card Verification Subsystem

Figure 4:
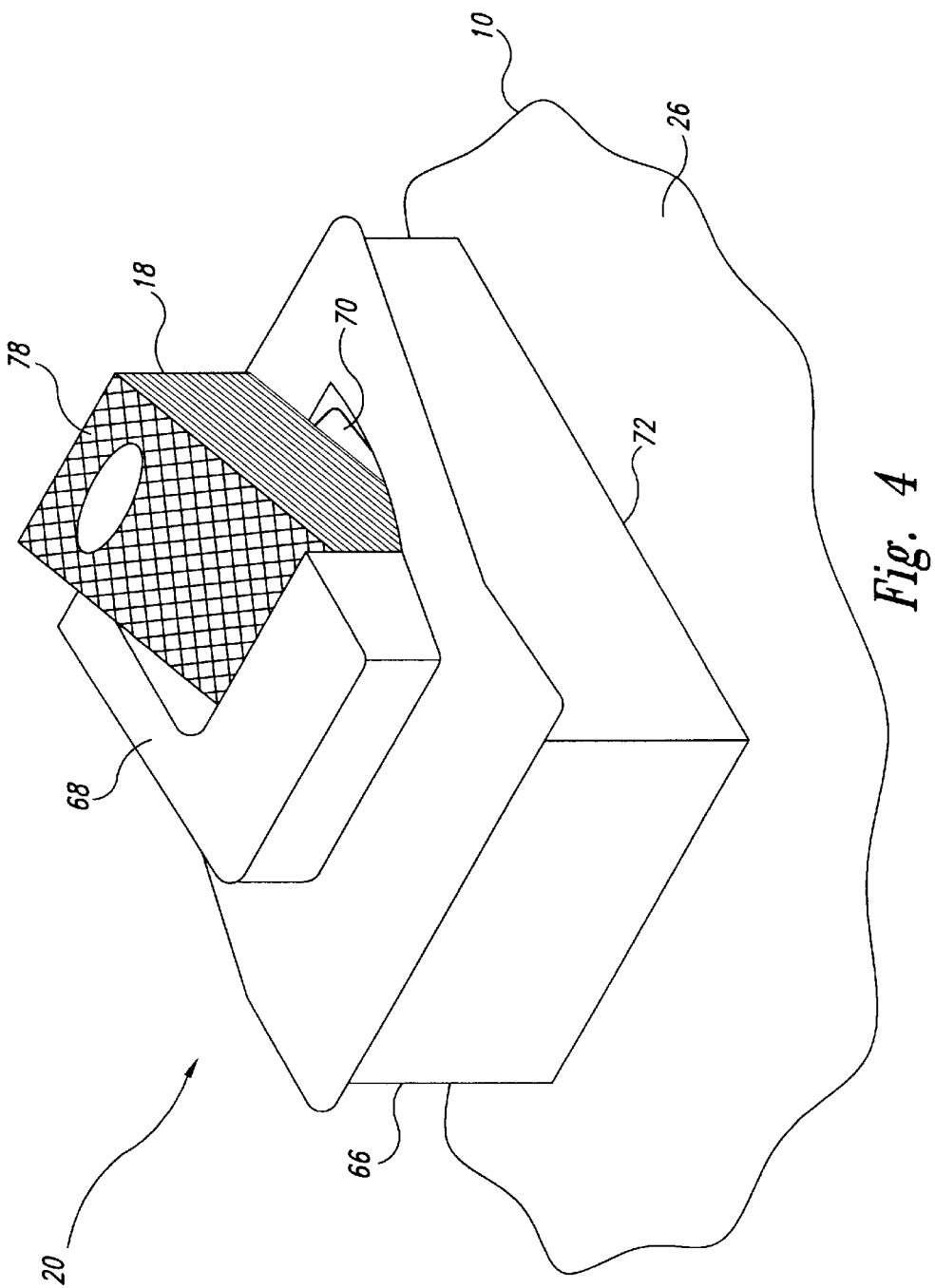
FIG. 4 is an isometric view of a card shoe holding a deck of playing cards in a cradle utilizing the present invention.

The card verification subsystem includes, as shown in FIG. 4, the card shoe 20 with a housing 66 and a cradle 68 sized and dimensioned to receive the card deck 18. A card support surface 70 of the housing 66 is sloped with respect to a base 72, to hold the cards 19 of the card deck 18 in the card shoe 20 are slightly shifted or staggered with respect to adjacent cards in the deck 18 (as shown in FIGS. 5 and 6) when the card shoe 20 is on the horizontal playing surface 26 of the gaming table 10 (FIG. 1).

As shown in FIGS. 5 and 6, a portion of each card 19 of the deck 18 is exposed when the deck 18 is in the cradle 68. The exposed portion may be an end portion 74 along an edge of the face 76 (i.e., surface bearing the rank and suit markings) or the back 78 (FIG. 4) (i.e., surface bearing a uniform marking for each card in the deck) of each of the cards 19 of the deck 18 depending on the orientation of the cards 19 in the cradle 68. Alternatively, the exposed portion can be on one side portion 80 along an edge of the face 76 or back 78 of the cards 19, if the cradle 68 is dimensioned to receive the deck of cards 18 in a sideways orientation (not shown). A slope of approximately 30° is sufficient to shift the cards 19 to expose the end portion 74 or side portion 80.

The exposed portions each carry identifying information about the card, and/or the card deck 18. For example, the rank and suit markings on the faces 76 of the cards can be exposed, which identify the value of each card 19 in the deck 18 in terms of rank and suit and which can be automatically read. The cards 19 can bear other machine-readable symbols such as bar code, area or matrix code, or stacked code symbols selected from respective symbologies to encode identifying information such as the rank and suit of the card, a unique serial number, and/or information about the card deck 18. For example, the cards 18 can carry bar code symbols 81 at one of the end portions 74 on the faces 76 of the cards as shown in FIG. 5. Look-up tables or an algorithm can relate the unique serial number to other identifying information such as the rank, suit, casino, manufacturer of the card and/or card deck 18. Use of a proprietary symbology can enhance security and efficiency. Encryption can also enhance security, for example, encrypting the unique serial numbers. The machine-readable symbols can also take advantage of error correction, to discover and correct errors, as is generally known in the symbology arts. While visibly shown in FIG. 5, the bar code symbols 81 can be printed using an ink that is not typically visible to humans, such as an ink that is only visible in the infrared portion of the electromagnetic spectrum.

The particular embodiment shown has a number of reading and security advantages over other embodiments. Printing the bar code symbol 81 in invisible ink makes the bar code symbols 81 difficult to detect and read, and also makes the deck marking unobtrusive to the players 14, 16 (FIG. 1). Printing the bar code symbol 81 on the face 76 of each card 19 of the deck 18 makes it difficult for someone other than the cardholder to read, since the cardholder typically shields the face 76 of the card 19 they hold from view to hide the rank and suit markings. Locating the bar code symbols 81 on the end portions 74 of the cards 19, makes it easy to expose the bar code 81 on all of the cards 18 at the same time, with requiring a large amount of space in the card holder 20. This is particularly true for the top and end portions 74, since playing cards 18 are typically longer than wide. After play, the end portions 74 of the cards 19 of the deck 18 can be easily trimmed to remove the bar code symbols 81, and the card deck 18 resold for reuse or as a souvenir.

Figure 7:
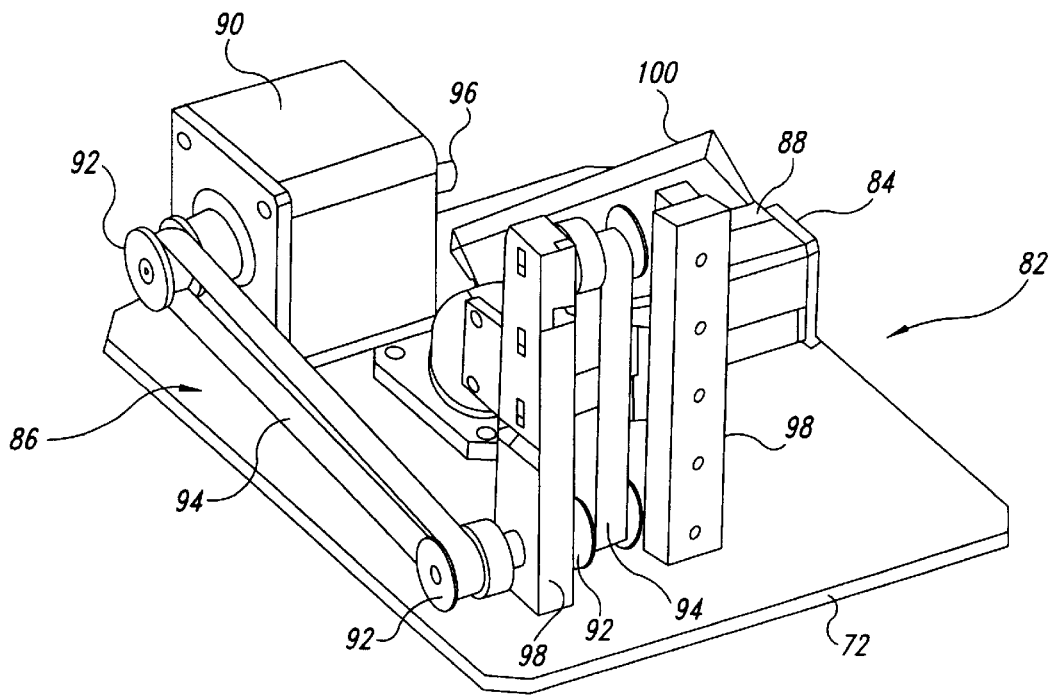
FIG. 7 is an isometric view of a card reader utilizing the present invention and including a card reading head and a drive mechanism to move a linear imager of the card reading head.

The card verification subsystem 62 also includes, as shown in FIG. 7, a card reader 82 with a card reading head 84 and drive mechanism 86 to read information from the end portions 74 of each of the cards 19 (FIGS. 5 and 6) while all of the cards 19 in the card deck 18 are in the card shoe 20 (FIG. 1). The card reading head 84 includes a linear charge-coupled device ("CCD") array 88, although the card reading head 84 can employ other scanning and imaging devices. For example, the card reading head 84 can employ imaging tubes (e.g, Vidicon, Plumbicon), and other image capture devices. Image data from the linear CCD array 88 passes to the gaming table CPU 52 (FIG. 3) for processing.

The drive mechanism 86 includes a motor 90, pulleys 92, and first and second drive belts 94 entrained on the pulleys 92 to couple the motor 90 to the reading head 84. The linear CCD array 88 can continuously image an area for the cards 19, or the placement of the card deck 18 in the cradle 68 can trigger a switch 96, that activates the motor 90 and linear CCD array 88. Movement of the motor 90 causes the linear CCD array 88 to oscillate between two positions along a pair of supporting rails 98 to move a field-of-view 100 of the linear CCD array 88 between an end portion 74 of a top card 102 in the deck 18 and an end portion 74 of a bottom or last card 104 in the deck (FIGS. 5 and 6). The card reader 82 is thus capable of reading information from every card in the deck 18 in the order the cards are positioned in the deck 18, before any cards are removed. This allows the dealer 12 to remove the entire deck 18 at one time and deal by hand, enhancing the gaming environment while still allowing the monitoring system 50 (FIG. 3) to know the order that the card 18 should appear as the cards 18 are dealt by the dealer 12 during game play. The card verification subsystem 62 can employ other drive mechanisms, for example a direct drive (not shown).

Figure 8:
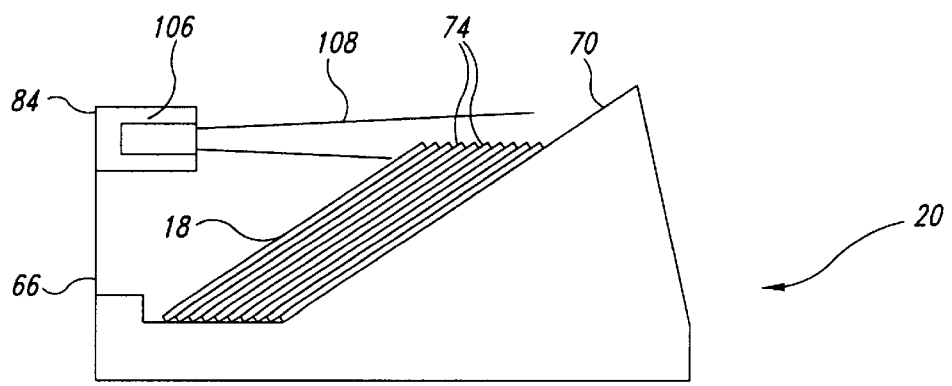
FIG. 8 is a right side cross-sectional view of an alternative embodiment of a card reader utilizing the present invention including a card reading head with an area imager.

FIG. 8 shows an alternative embodiment under the present invention employing a two-dimensional CCD array 106 in the card reading head 84. This alternative embodiment, and those alternative embodiments and other alternatives described herein, are substantially similar to previously described embodiments, and common acts and structures are identified by the same reference numbers. Only significant differences in operation and structure are described in detail below.

The two-dimensional CCD array 106 has a field-of-view 108 that is capable of imaging an area. The two-dimensional CCD array is positioned in the housing 66 such that the field-of-view 108 encompasses the exposed end portions 74 of each of the cards in the deck 18 at a same time, as the cards 19 are positioned on the sloped card support surface 70 of the card shoe 20. Thus, the alternative embodiment of FIG. 8 eliminates the drive mechanism 86 of FIG. 7.

Chip Tray/Chip Tray Monitoring Subsystem

Figure 9:
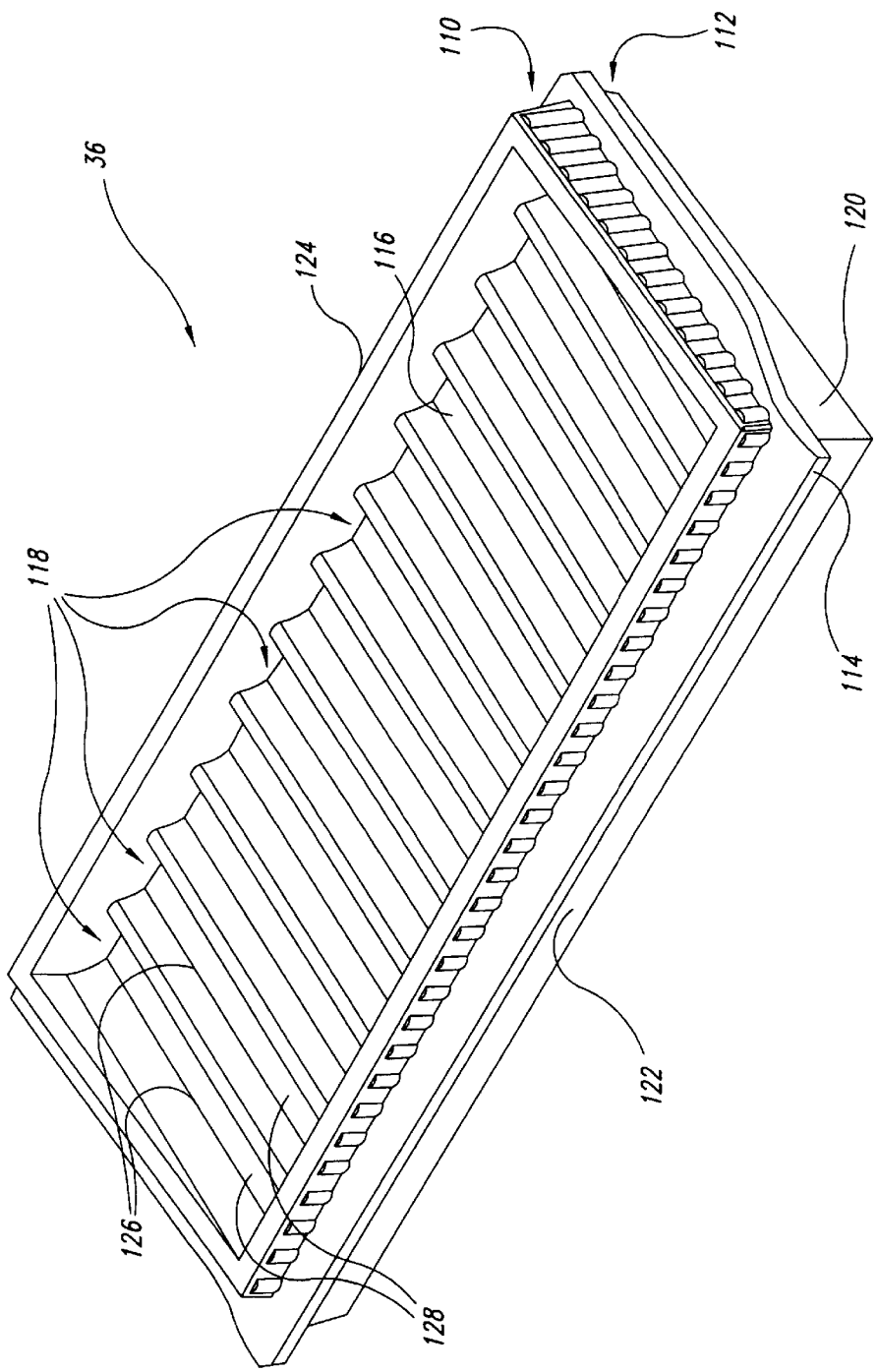
FIG. 9 is a top, front isometric view of a chip tray utilizing the present invention.

The chip tray 36 is shown in FIG. 9 as including upper and lower portions 110, 112, respectively, and a shelf 114 separating the upper and lower portions 110, 112. The upper portion 110 includes a chip carrying surface 116 having a number of wells 118 sized and dimensioned to accept the chips 38 (FIG. 1). A side wall 120 extends downwardly from the chip carrying surface 116 and thereabout to form a four-sided enclosure that contains the optical and electrical components of the play tracking and chip tray monitoring subsystems 56, 58, respectively. When in use on a gaming table 10, a front portion 122 of the side wall 120 faces the players 14, 16 and a rear portion 124 of the side wall 120 faces the dealer 12 (FIG. 1). The front portion 122 of the side wall 120 is slightly higher than the rear portion 124, and the chip carrying surface 116 slopes slightly downward from the front to rear.

A window 126 runs lengthwise along a bottom of each of the wells 118. Alternatively, the window 126 can run along a side of the well 118. The window 126 includes a tinted shield 128 that protects the inner optical and electrical elements of the play tracking and chip tray monitoring subsystems 56, 58 from view by the players 14, 16 and provides environmental protection for the components of the subsystems 56, 58.

FIGS. 10–12 show the components of the chip tray monitoring subsystem 58 mounted within the enclosure formed by the side wall of the chip tray 36 including a chip reader 130 having a chip reading head 132 and a drive mechanism 134. The chip reading head 132 includes a linear color CMOS sensor 136, although the chip reading head 132 can employ other image capture devices, such as those previously described. The color CMOS sensors 136 permit the chip tray monitoring subsystem 58 to work with existing chips and chip patterns, providing a significant advantage to the casino. The linear color CMOS sensor 136 is sensitive to the light passing through the tinted shields 128 in the wells 118 of the chip tray 36 (FIG. 9).

The drive mechanism 134 includes a motor 138, pulleys 140 and a pair of drive belts 142 coupling the motor 138 to the linear CMOS sensor 136 by way of the pulleys. The rotational drive of the motor 138 causes the linear CMOS sensor 136 to oscillate along a linear rail 144 extending between a left side 146 and a right side 148 of side wall 120 of the chip tray 36, successively aligning the linear CMOS sensor 136 with each of the windows 126 of the chip tray wells 118 (FIG. 9). The linear CMOS sensor 136 thus images the chips 38 in each of the wells 118 in the chip tray 36. Chip tray image data from the linear CMOS sensor 136 passes to the game table CPU 52 (FIG. 3) for processing. The chip tray monitoring subsystem 58 can include an illumination source such as light emitting diode ("LED") 150 to illuminate the chips 38 through the windows 126, or can rely on ambient lighting. The light emitting diode ("LED") 150 is mounted to travel with the linear CMOS sensor 136, thus reducing the amount of power required to illuminate the chips 38.

In an alternative embodiment (not shown), the chip reading head 132 includes a two-dimensional CMOS sensor array, having a field-of-view covering the each of the windows 126. The two-dimensional CMOS sensor array eliminates the need for the drive mechanism 134. In a further alternative (not shown), the chip reading head 132 includes a two-dimensional CMOS sensor array having a field-of-view covering at least two of the windows 126, but less than all of the windows 126.

Chip Tray/Play Tracking Subsystem

The play tracking subsystem 56 is shown in FIG. 10 as including a playing surface imager 152, positioned within the enclosure formed by the side wall 120 of the chip tray 36 to provide an approximately 180° view of the playing surface 26 in front of the chip tray 36. In this embodiment, the playing surface imager 152 consists of nine area CMOS color sensors $C_1$–$C_9$, although the playing surface imager 152 can employ a lesser or greater number of sensors. Each of the CMOS color sensors $C_1$–$C_9$ have a respective field-of-view 154. The playing surface imager 152 can employ other image capture devices, although area CMOS color sensors $C_1$–$C_9$ are particular suitable for imaging the chips 38 and cards of the deck 18 on the playing surface 26 of the gaming table 10, such as wager chips 22 and played cards 30–34. The CMOS color sensors $C_1$–$C_9$ can each be mounted within a respective aperture 156 formed in the front portion 122 of the side wall 120, below the shelf 114, or can be aligned with a respective one of the apertures 156. The CMOS color sensors $C_1$–$C_9$ provide a low angle view of the playing surface 26 (approximately 15°). This permits the CMOS color sensors $C_1$–$C_9$ to discern the height of the stacks of chips 22 for each of the players 14, 16, including the edges of individual chips, and the any cards appearing on the playing surface 30–34. The low angle also reduces the effects of shadows, typically associated with overhead lighting. The color sensors $C_1$–$C_9$ produce table image data for processing by the gaming table CPU 52 (FIG. 3) for processing.

Figure 13:
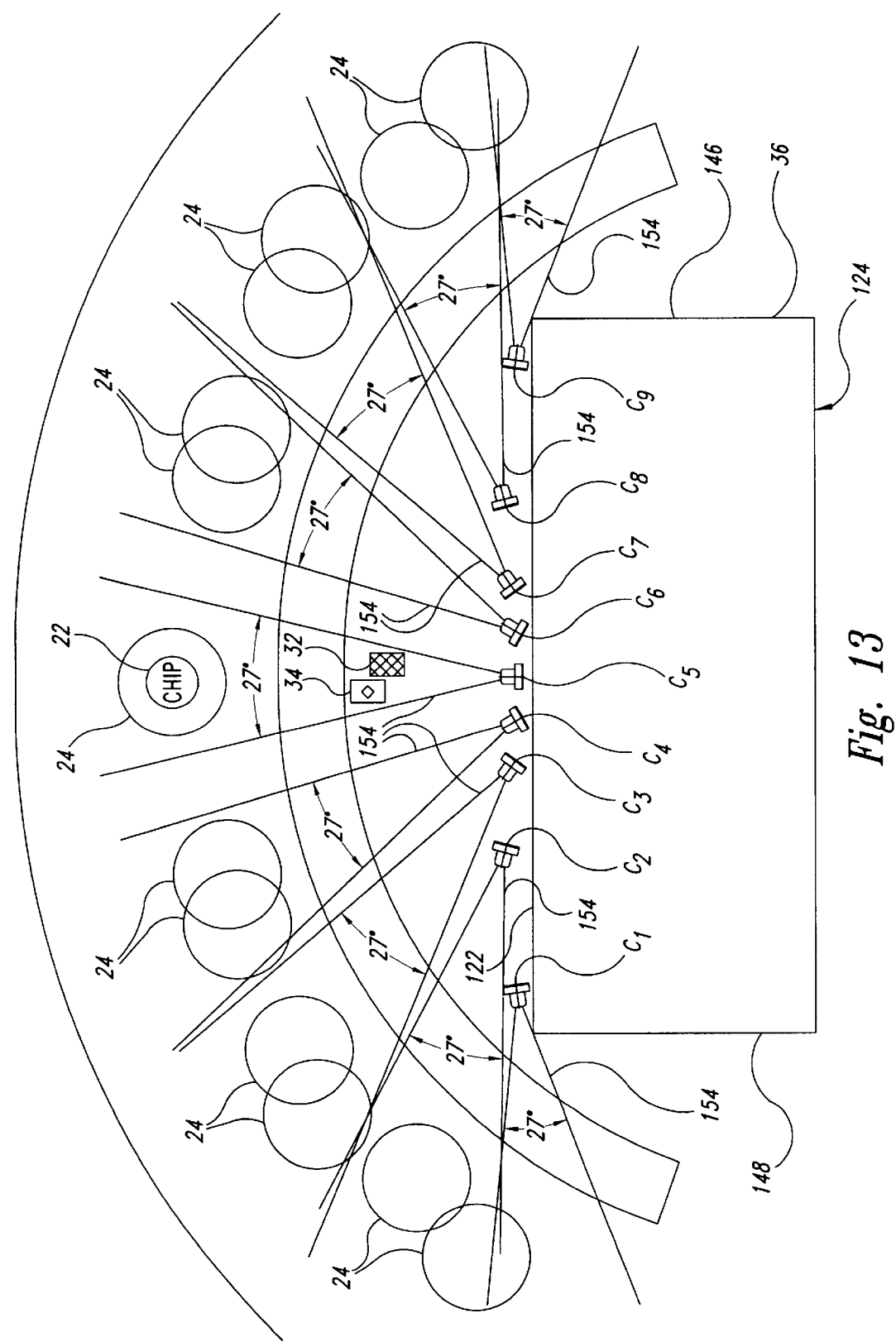
FIG. 13 is a top plan view of a composite field-of-view formed by a number of discrete fields-of-view of respective color sensors of the chip tray monitoring subsystem of FIG. 10.

With reference to FIG. 13, the composite field-of-view formed from the respective fields-of-view 154 of the nine CMOS color sensors $C_1$–$C_9$, permits the play tracking subsystem 56 to image substantially the entire playing surface 26 in front of the chip tray 36. Thus, the CMOS color sensors $C_1$–$C_9$ image the wager chips 22 and the played cards 30–34 of the players 14, 16 and dealer 12. By imaging at successive intervals, the play tracking subsystem 56 can detect the appearance or removal of a card 30–34 or chip 22.

As discussed above and as shown in FIG. 3, an opening 60 in the playing surface 26 of the gaming table 10 can receive the chip tray 36, such that the upper portion 110 extends above the playing surface and the lower portion 112 extends below the plaing surface of the gaming table 10. The shelf 114 of the chip tray 36 is positioned spaced above the playing surface 26. Positioning the area CMOS color sensors $C_1$–$C_9$ below the shelf 114 shields the color sensors $C_1$–$C_9$ or apertures 156 from the field-of-view of the players' 14, 16 when the chip tray 36 is on the gaming table 10. The shelf 114 also eliminates glare from overhead light, enhancing the image capturing ability of the CMOS color sensors $C_1$–$C_9$.

Drop Box/Cash Accounting and Validation Subsystem

The drop box 40 includes the cash accounting and validation subsystem 64 (FIG. 3) to authenticate items 41 of value inserted into the drop box, such as currency and chips, and to automatically keep track of the denomination or value of those items 41. The cash accounting and validation subsystem 64 analyzes images of the items 41 of value to authenticate the items 41 based on certain features, such as security features, and to determine the denomination of the items 41.

Figure 14:
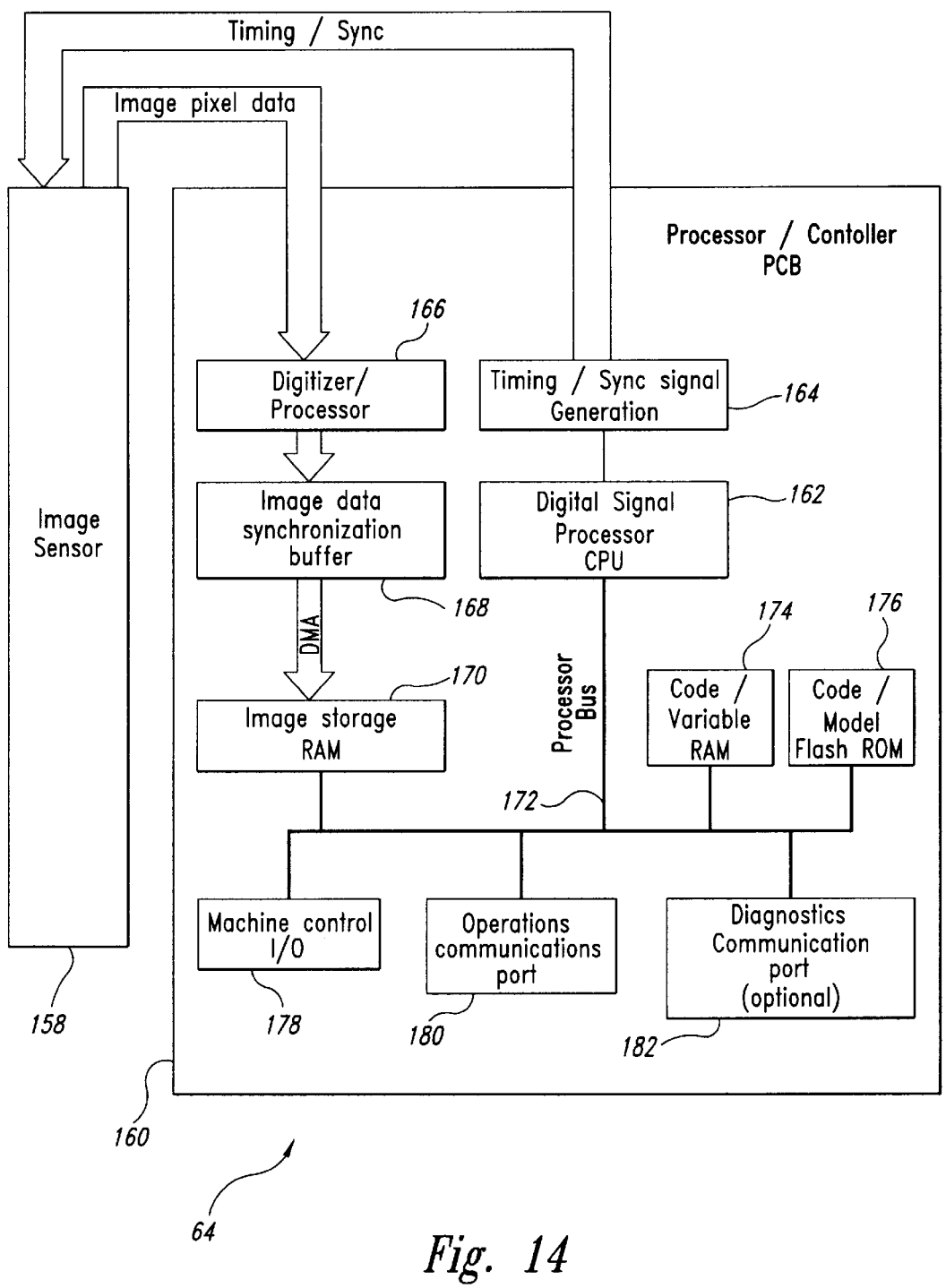
FIG. 14 is a functional block diagram of a cash accounting and validation subsystem of the present invention.

FIG. 14 shows the hardware components of the cash accounting and validation subsystem 64, including an image sensor 158 and a dedicated processor/controller printed circuit board ("PCB") 160 for processing the image pixel data from the image sensor 158. The image sensor 158 is a linear scan sensor that acquires high-resolution images selected portions of the item 41 of value. The resolution of the image can be set according to the particular feature or portion of the item 41 being imaged. Similarly, the illumination characteristics can also be set according to the particular feature or portion of the item 41. This permits each feature or portion to be correctly analyzed to authenticate the item of value. The image sensor 158 can image each security feature in the item 41, or only select features. The image sensor 158 can image entire features or portions of features. For example, only a portion of micro-print needs to be imaged to verify the authenticity of a micro-print feature., The cash accounting and validation subsystem 64 may alter the choice of features or portions to make forging more difficult.

A digital signal processor central processing unit ("DSP CPU") 162, (separate from the gaming table CPU 52) controls the operation of the processor/controller PCB 160. The processor/controller PCB 160 is coupled to the image sensor 158 to receive the image pixel data in response to a timing synchronization signal produced by a timing/synchronization signal generator 164. A digitizer/processor 166 receives the image pixel data from the image sensor 158 and produces image data that is buffered in an image data synchronization buffer 168. The image data synchronization buffer 168 pass the image data through direct memory access to an image storage random access memory ("RAM") 170.

A processor bus 172 provides communications between the DSP CPU 162 and a number of memories, including the image storage RAM 170, a code/variable RAM 174 and a code/model flash ROM 176. The processor bus 172 also provides communications between the DSP CPU 162 and a number of input/output ("I/O") ports, including a machine control I/O 178, an operations communications port 180 and a diagnostics communication port 182. The machine control I/O 178 can control the position of the image sensor 158 with respect to the item 41 of value, for example, controlling a drive mechanism (not shown) that moves either the image sensor 158, the item 41 of value, or both.

The processor/controller PCB 160 may include additional components, or may eliminate some of the described components as will be recognized by those skilled in the art.

System Operation Overview

Figure 15:
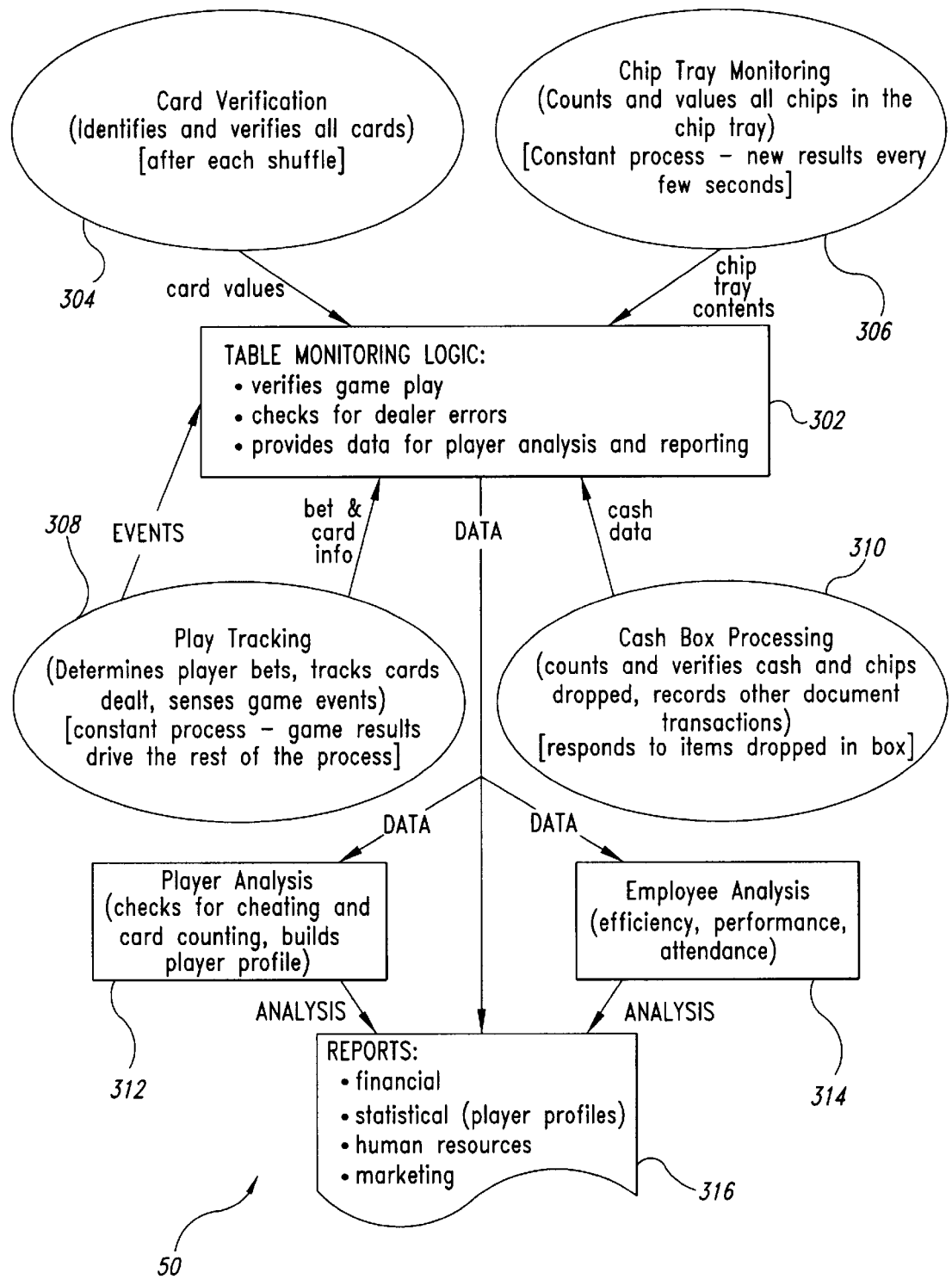
FIG. 15 is a functional block diagram of the overall operation of the gaming table monitoring system of the present invention.

The overall operation of a monitoring system 50 used in the illustrate embodiment of the invention is shown in FIG. 15 as set out by discrete functions. The functions can be implemented in software, as described in the software sections below. A table monitoring logic function 302 serves as the central element of the system, receiving data from the various other functions. The table monitoring logic 302 uses the data from the other components to verify game play, check for dealer errors, and provide data for employee and player analysis, as well as for reporting. The table monitoring logic 302 is driven by game events occurring at the gaming table 10 (i.e., activity at the gaming table such as the placing of wagers, dealing of cards, splitting of card hands, etc.).

A card verification function 304 reads identifying information from every card in the deck 18 prior to any of the cards being removed from the card shoe 20, and verifies that the deck 18 has not been tampered. The identifying information can identify every card 18 by rank and suit. The identifying information can employ a unique identifier, such as a unique serial number encoded in the machine-readable symbol 81 (FIG. 5), that provides access to the rank and suit through a look-up table or algorithm. Card verification 304 provides card identifying information to the table monitoring logic 302.

A chip tray monitoring function 306 continually monitors the chips 38 in the chip tray 36. Chip tray monitoring 306 provides a measure of the chip tray contents (i.e., counts and values of all chips 38 in the chip tray) to the table monitoring logic 302. The chip tray monitoring 306 can provide notice to the casino when a chip tray 36 at a particular one of the gaming tables 10 is running low, to allow additional chips to be delivered to the gaming table.

A play tracking function 308 monitors the activity on the playing surface 26 of the gaming table 10. Play tracking 308 continually determines the player's wager chips 22, tracks the appearance, removal and position of cards 30–34 on the playing surface 26, and otherwise determines the occurrence of other game events. The game events are the stimuli that drive the operation of the monitoring system 50, including the table monitoring logic 302. Play tracking 308 provides wager and card appearance information to the table monitoring logic 302, as well as notice of the occurrence and identity of other game events.

A cash box processing function 310 authenticates items 41 of value placed in the drop box 40, and determines the denomination of those items 41, including chips, currency, and other items of value. The reference to "cash" is simply for convenience and is not meant to limit the claims or description. The cash box processing function 310 provides cash value data to the table monitoring logic 302.

A player analysis function 312 receives data from the table monitoring logic 302, and checks to determine if there are statistical signs of prohibited player strategies, such as: card counting, knowledge of the top card; knowledge of the hole card; bet progressions; shuffle tracking; and chasing of Aces. The player analysis 312 also builds a profile of the players 14, 16.

Figure 20:
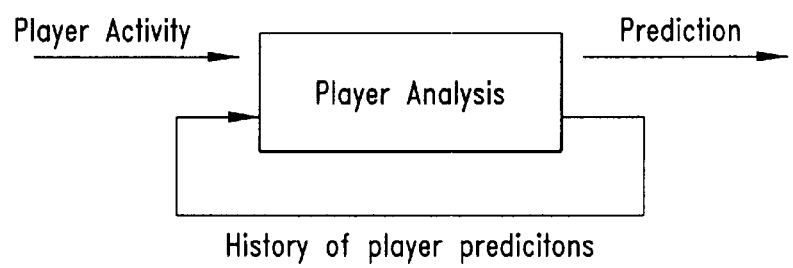
FIG. 20 is a flowchart of a method of the present invention for dynamically adjusting player strategy predictions.

To analyze the player strategy, the gaming table CPU 52 can compare a player's decision based on the player's knowledge of his own player held cards 30 as well as any other face up played cards 30 on the gaming table (FIG. 1) and with assumed knowledge of at least one other card, against a table of decisions the would be considered correct for a given strategy. The correct decision is constantly updated based on the dealt cards since the correct decision requires a knowledge of the cards presently held by the player. For example, under a "perfect" strategy, the monitoring system 50 would assume the player 14 knew the cards held by the player 14, the face up card 34 of the dealer 12, and the value of the next ("top") card in the deck 18 before the next card is dealt. The monitoring system 50 accumulates a record of the player's performance under each strategy used by the system for analysis purposes. Where the player's record exceeds some statistically reasonable or meaningful expectation, the monitoring system 50 predicts that the player 14 is employing one of the prohibited strategies. The monitoring system 50 provides the prediction to casino personnel, such as the dealer 12. As shown in FIG. 20, the monitoring system 50 may continue to track the player 14, making predictions, and comparing the predictions to previous predictions. By analyzing the history of predictions, the monitoring system 50 can determine how accurate the predictions are, and change the point at which a prediction is made. For example, the monitoring system 50 can adjust the number of hands required before making a prediction, or adjust the amount of statistical aberration (i.e., statistically meaningful) data required before making a prediction.

An employee analysis function 314 receives data from the table monitoring logic 302, and analyzes the data for the employee dealer 12 efficiency, performance and attendance.

A report function 316 receives data from the table monitoring logic 302, and analysis from the player and employee analysis 312, 314, respectively. The report function 316 generates appropriate reports regarding the playing habits of the players 14, 16 and about the performance and efficiency of the employee dealer 12. Reports can cover all aspects of the gaming, including financial reports, statistical reports based on player profiles, human resources reports based on employee data and marketing reports.

Software Overview

Figure 16:
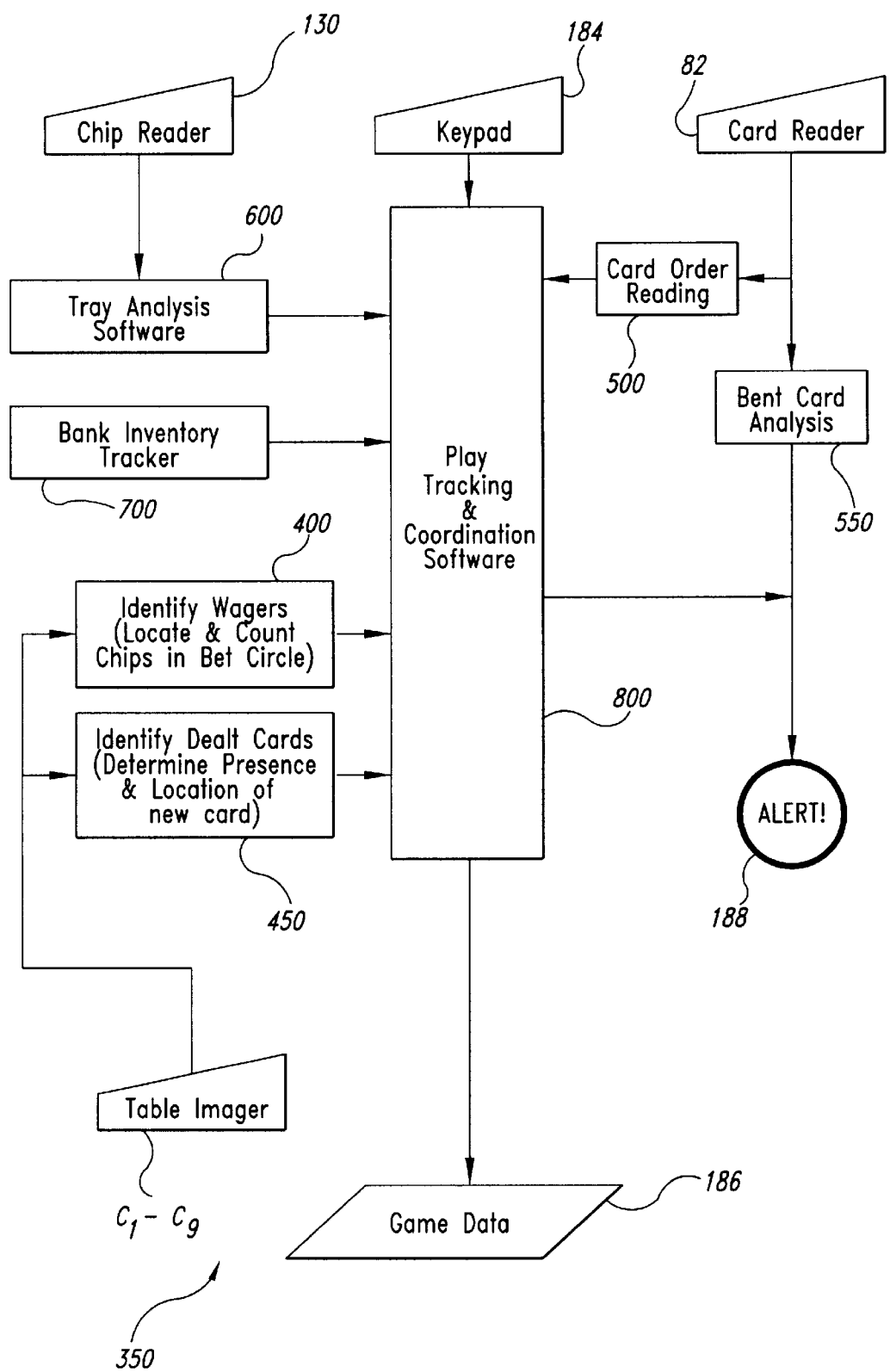
FIG. 16 is a block diagram of the interaction of a number of software modules implementing the functionality of FIG. 15.

A software system 350 for implementing the above described functionality is shown in FIG. 16. The system 350 includes a number of discrete software modules and hardware devices, that interact with the various components of the respective subsystems 56, 58, 62, 64 to acquire data, and in some cases to interpret or analyze the data and/or control the operation of the components. The software modules and the various hardware devices monitor and analyze the gaming activity at a single gaming table 10.

A play tracking and coordination software module 800 acts as the focus, receiving data and signals from the other software modules, including: an identify wagers software module 400; an identify dealt cards software module 450; a card order reading software module 500; a bent card analysis software module 550; a tray analysis software module 600; and a bank inventory tracker software module 700. The play tracking and coordination software module 800 can also receive input from a keypad 184, output game data 186, and produce alerts 188. Game events drive the play tracking and coordination module 800, which implements the table monitoring logic function 302 (FIG. 15), and thus controls the overall operation of the monitoring system 50.

The software system 350 monitors all events occurring at the blackjack gaming table 10 during the playing of the game and outputs status information to an on-line data base for immediate review and/or later review. The system 350 runs on a hardware platform that provides images of several different areas on the gaming table 10. The analysis of these images allows the system 350 to track the progress of the game.

Before play begins, the dealer 12 places a newly shuffled deck 18 of playing cards 19 into the card shoe 20 (FIG. 1), to read the bar code symbols 81 from the edge 74 of each of the playing cards 19 (FIG. 5) that encode the identifying information for the cards. The bar code symbols 81 contains information regarding the rank and suit of each of the cards 19 in the deck 18, among other information. The bar coded information is held in memory and not decoded until the cards are dealt. This ensures that the system 350 will have no prior knowledge about the order of the cards that would yield an unfair advantage to either the house or the players 14, 16. Only after the play tracking subsystem 56 detects a card being dealt (i.e., a new card landing on the playing surface 26) is the bar code symbol 81 for the card decoded. The bar code data is also decrypted, if necessary. In an alternative embodiment, the bar code symbol 81 can be decoded before the card is dealt, if the information is not decrypted or otherwise made available to the monitoring system 50.

As play begins, the components of the subsystems 56, 58, 62, 64 (FIG. 3) continuously acquire images of the gaming table 10. For each image that is centered on one of the wager circles 24 (FIG. 1), the area around the wager circle 24 is compared to the same area in a previous image. If a difference is detected, it is assumed that a wager has been placed and the player's position in wager chips 22 or equivalent value is noted. For each image that has a view of the dealer position (i.e., area in front of chip tray 36 and behind demarcation), a similar comparison with a previous image detects the presence of the dealer's cards 32, 34 (FIG. 1). Once the dealer's cards 32, 34 are detected, it is assumed that all wagers are final, and the most recent images containing wagers chips 22 are saved for processing. The system 350 is not slowed by this process since the detection processing on each image takes approximately the same amount of time as the acquisition of the next image.

At this time, the imaging of the chips 38 of the chip tray 36 is initiated since the contents of the tray 36 should be static until the current play round is over. The imaging will take some time to complete, and the completed image is stored until the round is finished when CPU time is available for the processing of the completed image.

Once play has begun, images of active player positions, determined by the previous detection of wager chips 22, are scanned for the presence of new cards. Once a hit is detected at a particular player position (i.e., an area proximate a player's wager circle 24), the card information for the newly played card is decrypted and the current value of the player's hand is determined. At this point, the value of all previous hands are examined to determine if the detected hit pattern is consistent with the card sequence up to this point. If the system 350 determines that the card sequence is valid, the accumulated event information is output to various reporting applications.

Since the actual card sequence may have been altered, either accidentally or intentionally after the deck 18 was read, it is possible that the hit pattern and the card sequence may not agree. This would occur if a card was dropped and placed in a discard rack, or if a new card were placed in the deck. If this occurs, the system 350 will continue to accumulate data as new cards are played, and the system 350 will attempt to resynchronize by shifting the assumed card sequence until it matches the hit pattern. Once this has been accomplished, the accumulated data is output.

When the dealer 12 finishes the play round, the stored images for the wager chips 22 and the chip tray 36 are analyzed to determine the dollar amounts that should have been exchanged on that round. At this point, all accumulated information is output to the reporting applications and the software system 350 scans for the start of a next round of play.

Thus, the monitoring system 50 allows casino management to track statistical information on possible player cheating, win/loss rates, and employee productivity in real-time. This is done in a discrete manner that does not interfere with the normal course of play. The individual software modules are discussed in detail below.

While FIG. 16 sets out the software modules as discrete elements, the software can be written as a single program, or in modules other than those described. Additionally, the instructions can be encoded in the system as hardware or firmware. In the illustrated system, the gaming table CPU 52 (FIG. 3) executes the modules other than the bank inventory tracker software module 700. The dedicated DSP CPU 160 (FIG. 14) executes the bank inventory tracker module 700. As described above, other more centralized or distributed arrangements are possible.

Identify Wagers Software Module/Identify Dealt Cards Software Module

The identify wagers software module 400 and the identify dealt cards software module 450 cooperate with the play tracking subsystem 56 (FIG. 3) to track and identify the occurrence of game events on the playing surface 26 of the gaming table 10 (FIG. 1). Thus, the identify wagers software module 400 and the identify dealt cards software module 450 perform the play tracking function 308 (FIG. 15), recognizing the wagering and playing activity at the gaming table 10 (FIG. 1).

Figure 17A:
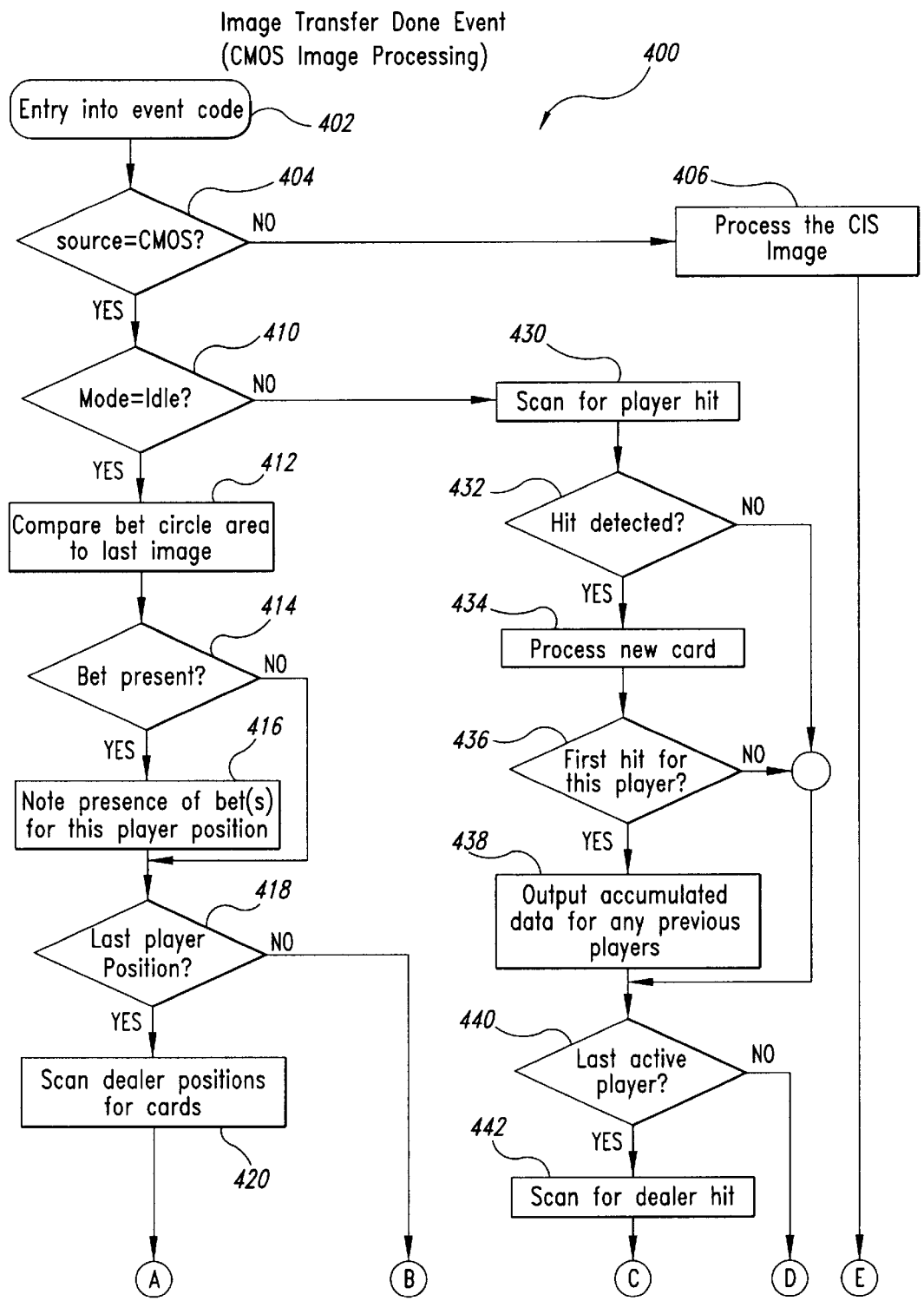
FIGS. 17A and 17B is a flowchart of a method of the present invention for identifying wages and dealt cards.
Figure 17B:
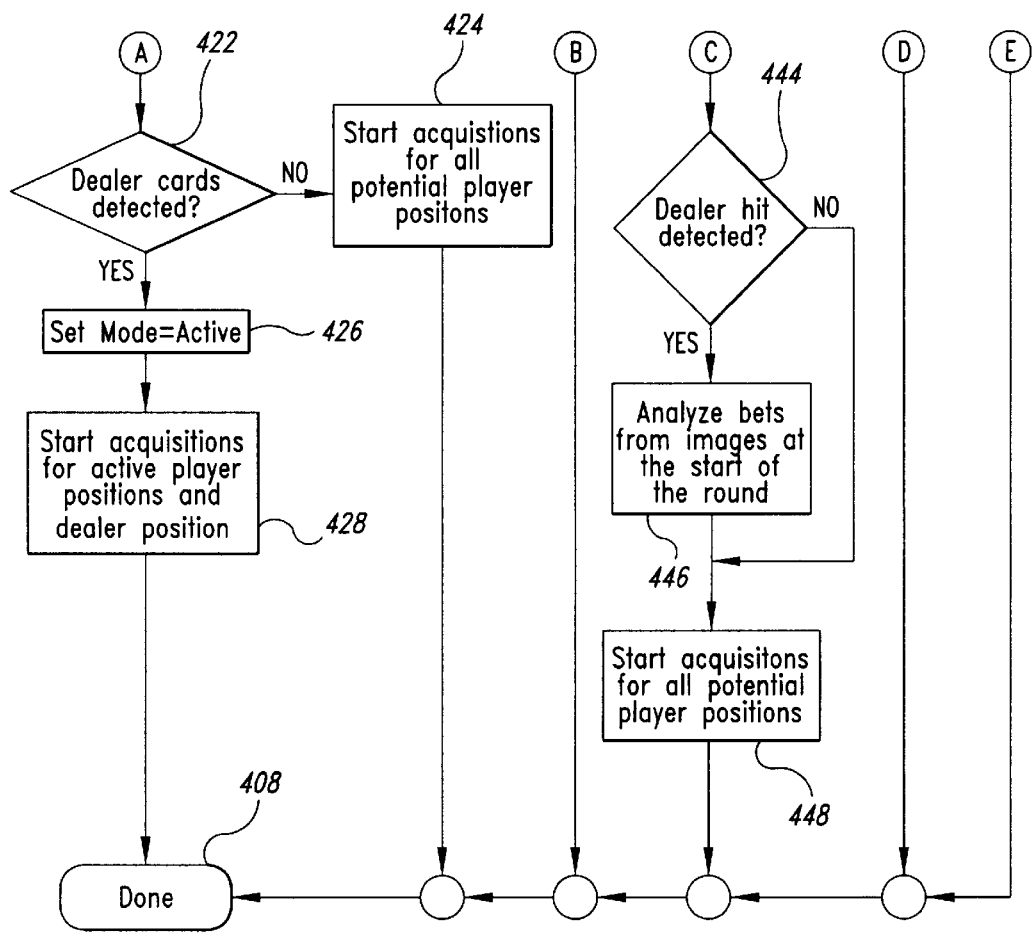

FIGS. 17A and 17B show a method of identifying wager chips 22 and dealt cards 30–34. The gaming table CPU 52 enters the routine 400 at an entry step 402. The gaming table CPU 52 determines the source of the image data in step 404. If the source of the event is not the CMOS color sensors $C_1$–$C_9$, the gaming table CPU 52 in step 406 processes the image data (see description of FIG. 18, below), and terminates the routine 400 at a Done step 408. If the source is the CMOS color sensors $C_1$–$C_9$, the gaming table CPU 52 determines if a player position is "Idle" in a step 410. The player position is "Idle" if no wager chips 22 are detected at the player position, including the wager circles 24.

If the gaming table CPU 52 determines that the player position is "Idle" in step 410, the gaming table CPU 52 compares the wager circle 24 in the present image to the wager circle 24 in last image, in a step 412. In step 414, the gaming table CPU 52 determines from the comparison whether wager chips 22 are present. If wager chips 22 are present, the gaming table CPU 52 notes the presence of one or more wager chips 22 for the player position in step 416, and passes control to step 418. If a wager 22 is not present, the gaming table CPU 52 pass control directly to step 418 to determine whether the position is a last player position. If the position is a last player position, the routine 400 terminates at the Done step 408. If other player positions exist, the gaming table CPU 52 scans the dealer position of dealer 12 for cards in a step 420. If in step 422, the gaming table CPU 52 does not locate cards at the dealer 12 positions, the gaming table CPU 52 starts acquisitions for all potential players in step 424. Otherwise the gaming table CPU 52 sets the player position as "Active" in step 426, and starts the acquisition of all "Active" player positions and the dealer position in step 428. The routine 400 terminates at the Done step 408.

If the player position is not "Idle," the gaming table CPU 52 scans for a hit by one of the players 14, 16 (FIG. 1) in step 430. (The player position is not "Idle" if wager chips 22 are located at the player position.) If the gaming table CPU 52 detects a hit in step 432, the gaming table CPU 52 processes the new card in step 434, and determines if the new card is the first hit for the player 14, 16 in step 436. If in step 436, the gaming table CPU 52 determines that the new card is the first hit for the player 14, 16, the gaming table CPU 52 outputs accumulated data for any previous player in step 438, and passes control to step 440. If the gaming table CPU 52 does not detect a hit in step 432, control passes directly to step 440. If the new card is not the first hit for the player, the gaming table CPU 52 passes control directly to the step 440, where the CPU 52 determines whether the player position is a last "Active" player position. If the gaming table CPU 52 determines that the player position is a last "Active" player position, the gaming table CPU 52 terminates the routine 400 at the Done step 408. Otherwise, the gaming table CPU 52 scans the image data for a dealer hit in step 442. In step 444, the gaming table CPU 52 determines whether the dealer 12 took a hit from the scanned image data. If the gaming table CPU 52 determines that the dealer 12 took a hit, the CPU 52 analyzes the wager chips 22 from the images at the start of the round in step 446, and starts acquisitions for all potential player positions in step 448. If the gaming table CPU 52 determines that the dealer 12 did not take a hit in step 444, control passes directly to the step 448 where the monitoring system 50 starts acquisitions for all player positions. The routine 400 terminates at the Done step 408.

Figure 18:
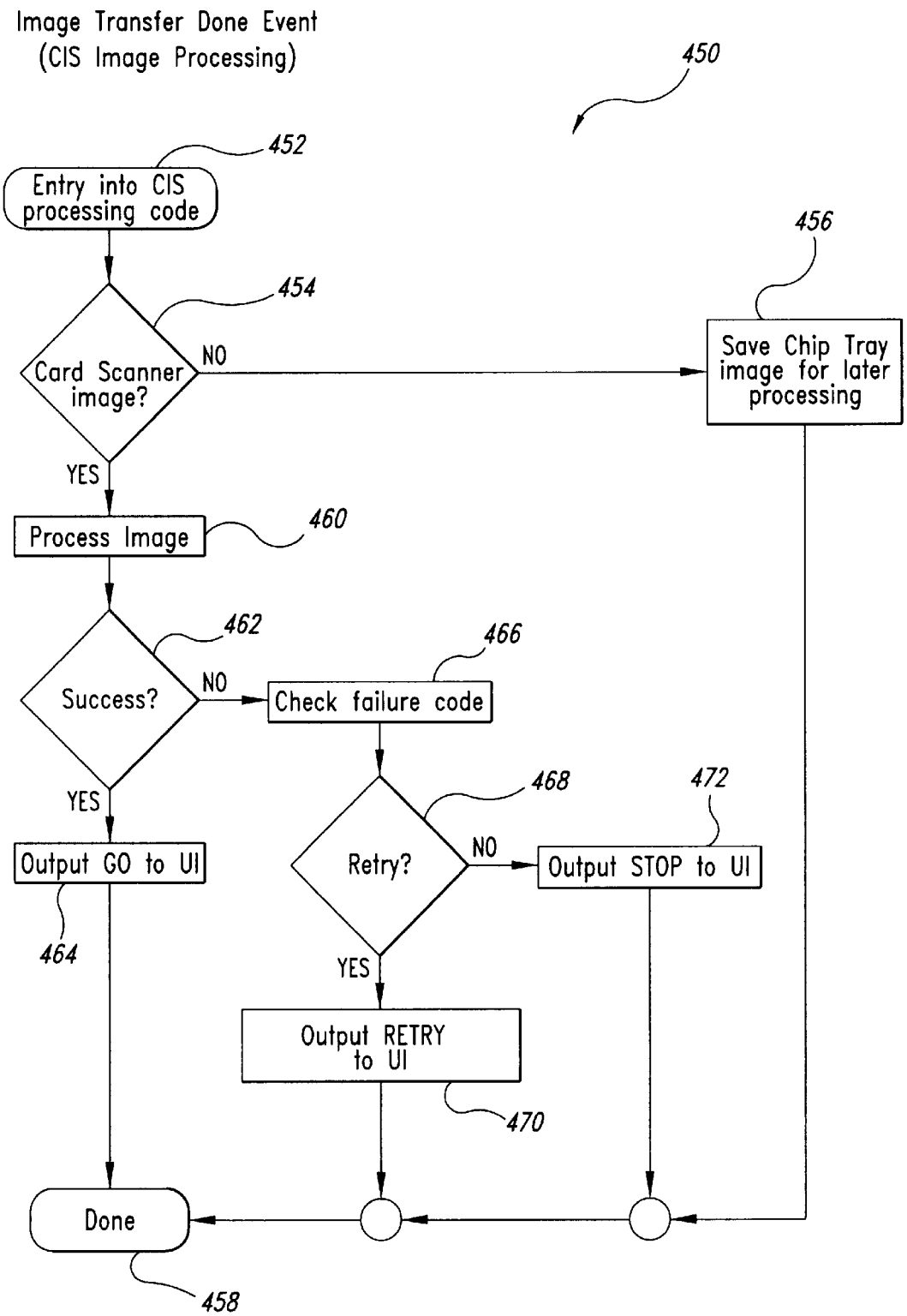
FIG. 18 is a flowchart of a method of the present invention for processing image data from card and chip readers.

FIG. 18 shows a software routine 450 of processing the image data referred to as the step 406 in FIGS. 17A and 17B, above. The gaming table CPU 52 enters the routine 450 at an entry step 452. In step 454, the gaming table CPU 52 determines if the image data is from the card reader 82. If the image data is not from the card reader 82 (FIG. 7), the gaming table CPU 52 determines that the image data must be from the chip reader 130 (FIGS. 10–12) of the chip tray 36 and stores the image data to memory for later processing in step 456. The routine 450 terminates at a Done step 458. If the image data is from the card reader 82, the gaming table CPU 52 processes the image data in step 460 (see description of FIG. 19, below).

In step 462, the gaming table CPU 52 determines whether the processing is successful. If processing is successful, the gaming table CPU 52 outputs a GO command in step 464. If the processing is not successful, the gaming table CPU 52 checks a failure code in step 466. In step 468, the gaming table CPU 52 determines whether the gaming table CPU 52 should make another attempt at processing the image, based on the failure code. If the gaming table CPU 52 determines that another should be made, the gaming table CPU 52 outputs a RETRY command in step 470 and terminates the routine 450 at the Done step 458. If not, the gaming table CPU 52 outputs a STOP command in step 472 and terminates the routine 450 at the Done step 458.

Card Order Reading Software Module

As shown in FIG. 16, a card order reading software module 500 interacts with the hardware components of the card verification subsystem 62 (FIG. 3) to perform the card verification function 304 (FIG. 15) by reading and verifying the cards in the card deck 18 before a first card is withdrawn from the card shoe 20 (FIG. 1).

Figure 19:
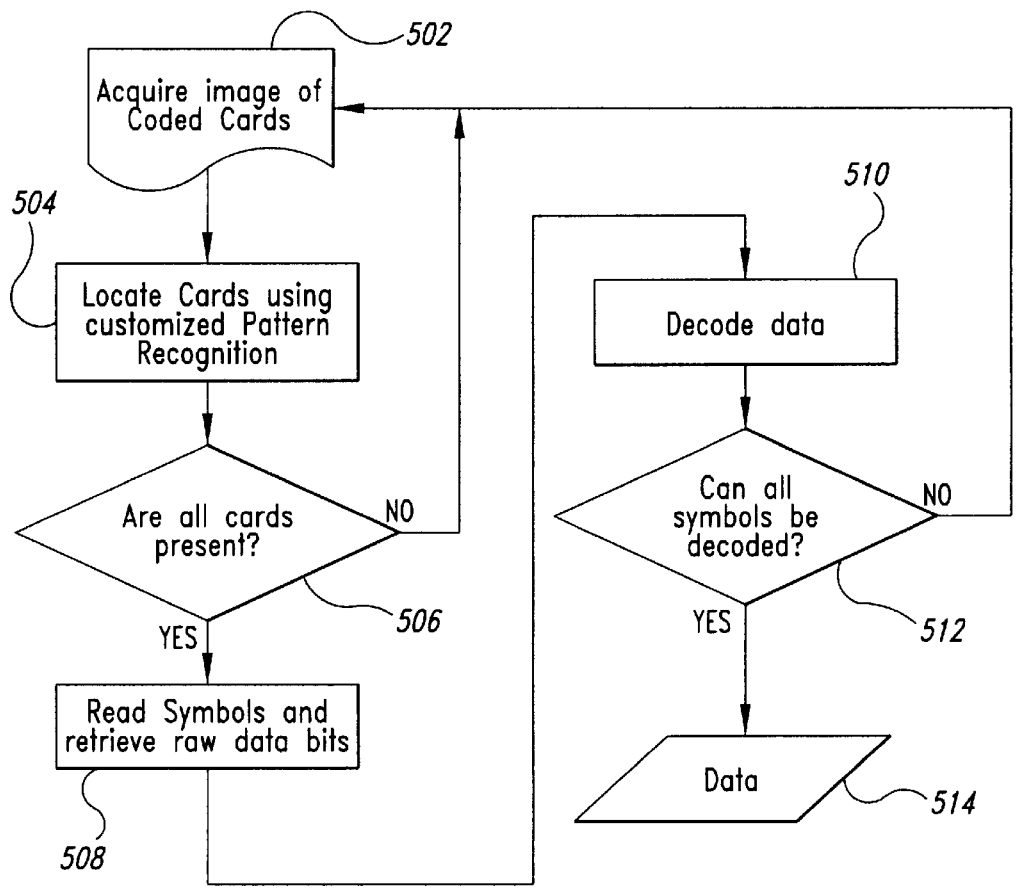
FIG. 19 is a flowchart of a method of the present invention for reading a deck of cards before any of the cards are dealt.

A method of implementing the card order reading software module 500 is shown in FIG. 19. The card order reading module 500 will typically execute after the dealer 12 shuffles the card deck 18 and places the shuffled deck in the card shoe 20. The structure of the card shoe 20 aligns the cards in an offset fashion to expose at least the end portion 74 of the card bearing identifying information, in the form of the machine-readable symbol 81. As noted above, the bar code symbol 81 can alternatively be an area or matrix code, or stacked code selected from a symbology. The symbol can also be any other markings on the card, including the rank and suit of the card as is normally printed on the card face 76. In some instances, the card deck 18 would not have to be shuffled and the card reading head 84 would not have to be located in the card shoe 20.

The gaming table CPU 52 acquires an image of the coded object in step 502. For example, the linear CCD array 88 of the card reading head 84 passes across each of the cards in the deck 18, capturing an image of the bar code symbols 81 printed the cards 19. In step 504, the gaming table CPU 52 locates the deck of cards 18 within the image. In step 506, the gaming table CPU 52 compares the number of located cards 19 in the image to the expected number of cards in the deck 18 to determine whether all of the cards in the deck 18 are present. If one or more cards are missing, control returns to step 502, to acquire another image. The card reader 82 can prompt the dealer 12 to realign the card deck 18, if necessary. If all of the playing cards 19 in the deck 18 are present, the gaming table CPU 52 reads the symbols 81 and produces raw, coded data bits in step 508. In step 510, the gaming table CPU 52 decodes the raw, coded data. The gaming table CPU 52 determines whether all of the bar code symbols 81 can be decoded in step 512. The decoding an algorithm can include error checking. For example, the algorithm may be able to detect up to 32-bit errors and correct up to 16-bit errors. Other error checking schemes are possible. Control returns to step 502 if all of the bar code symbols 81 can not be decoded. The gaming table CPU 52 produces data 514 if all of the bar code symbols 81 can be decoded.

Bent Card Analysis Software Module

As shown in FIG. 16, a bent card analysis software module 550 interacts with the hardware components of the card verification subsystem 62 (FIG. 3) to perform the card verification function 304 (FIG. 18) by reading and verifying the cards 19 in the card deck 18 before any card is withdrawn from the card shoe 20.

The card reader 82 also checks the cards for crimping. Crimping involves marking the cards 19 by bending or folding the card toward or away from the face 76 to identify the card's relative rank. For example, cards having a value of ten, such as tens and face cards, can be bent upward. Additionally, or alternatively, cards of relatively low rank, such as two through five, are bent downward. The convexity or concavity in the card is subtle to avoid detection, but sufficiently pronounced to be perceptible by the player who has bent the card 19.

Tray Analysis Software Module

As shown in FIG. 16, a tray analysis software module 600 interacts with the hardware components of the chip tray monitoring subsystem 58 (FIG. 3) to perform the chip tray monitoring function 306 (FIG. 15) by monitoring the chips 38 in the chip tray 36, either continually or periodically.

Figure 21:
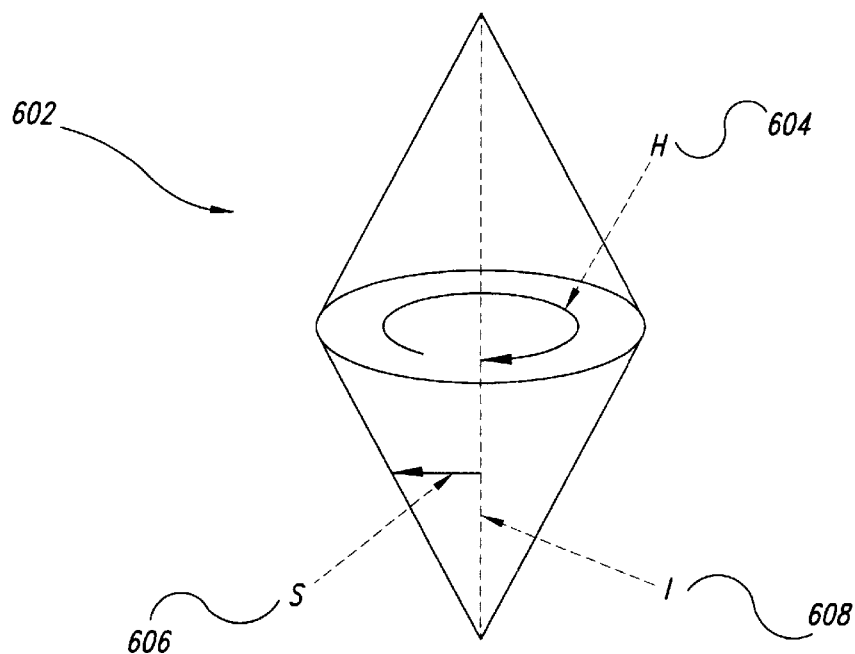
FIG. 21 is a representation of a three-dimensional hue, intensity and saturation ("HIS") color space used in the present invention.
Figure 22:
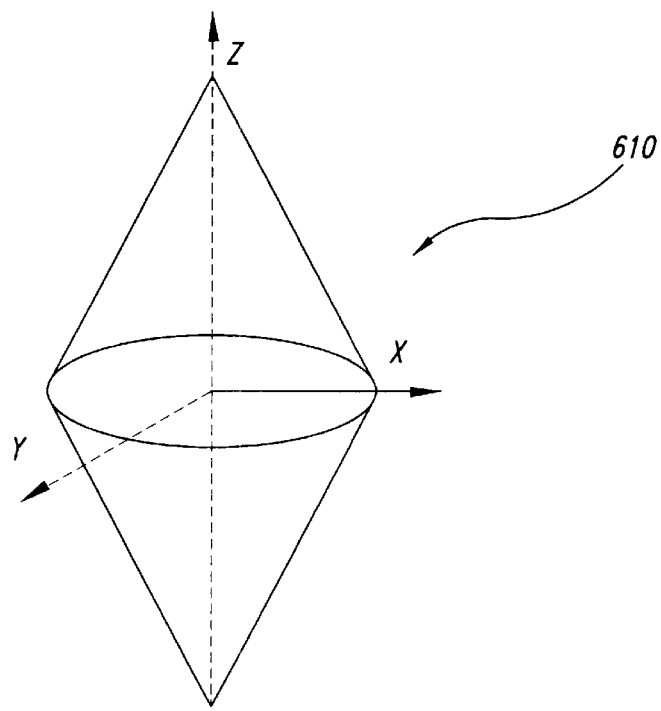
FIG. 22 is a representation in Cartesian coordinates of the three-dimensional HIS color space of FIG. 24 used in the present invention.

The tray analysis software module 600 relies on a color space representation of color. FIG. 21 shows a hue, saturation and intensity ("HIS") color space 602. In the color space 602, "H" 604 represents the hue expressed as an angle between 0° and 360°, the "S" axis 606 corresponds to level of saturation expressed as a value from 0 to 1, and the "I" axis 608 corresponds to intensity expressed as a value from 0 to 255. FIG. 22 shows an "XYZ" color space 610 equivalent to the HIS color space 602 of FIG. 21. The XYZ color space 610 is a Cartesian representation of the HIS color space, having coordinates with a range of −1 to 1. The Cartesian coordinates of the XYZ color space 610 allow the differences between colors to be measured as a three-dimensional distance, permitting relatively easy comparisons of colors using standard vector algebra.

Figure 23A:
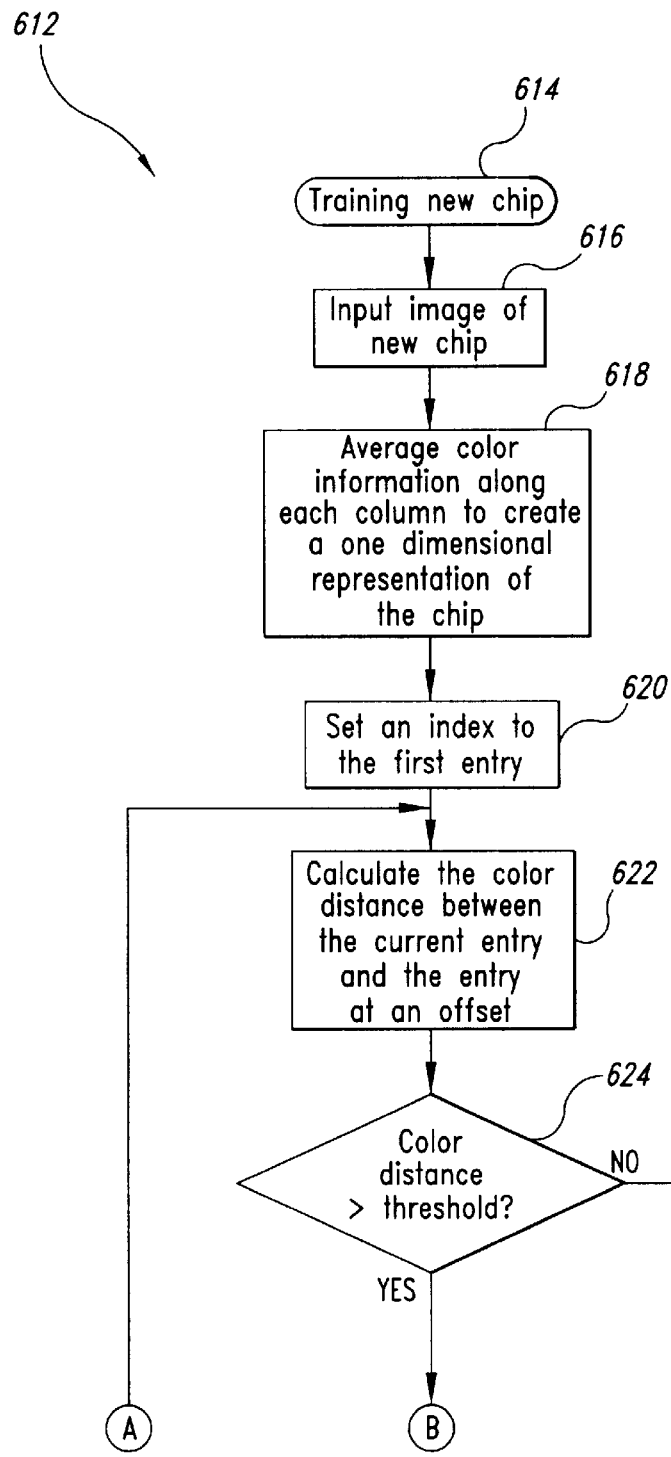
FIGS. 23A and 23B is a flowchart of a method of the present invention for learning new chip patterns.
Figure 23B:
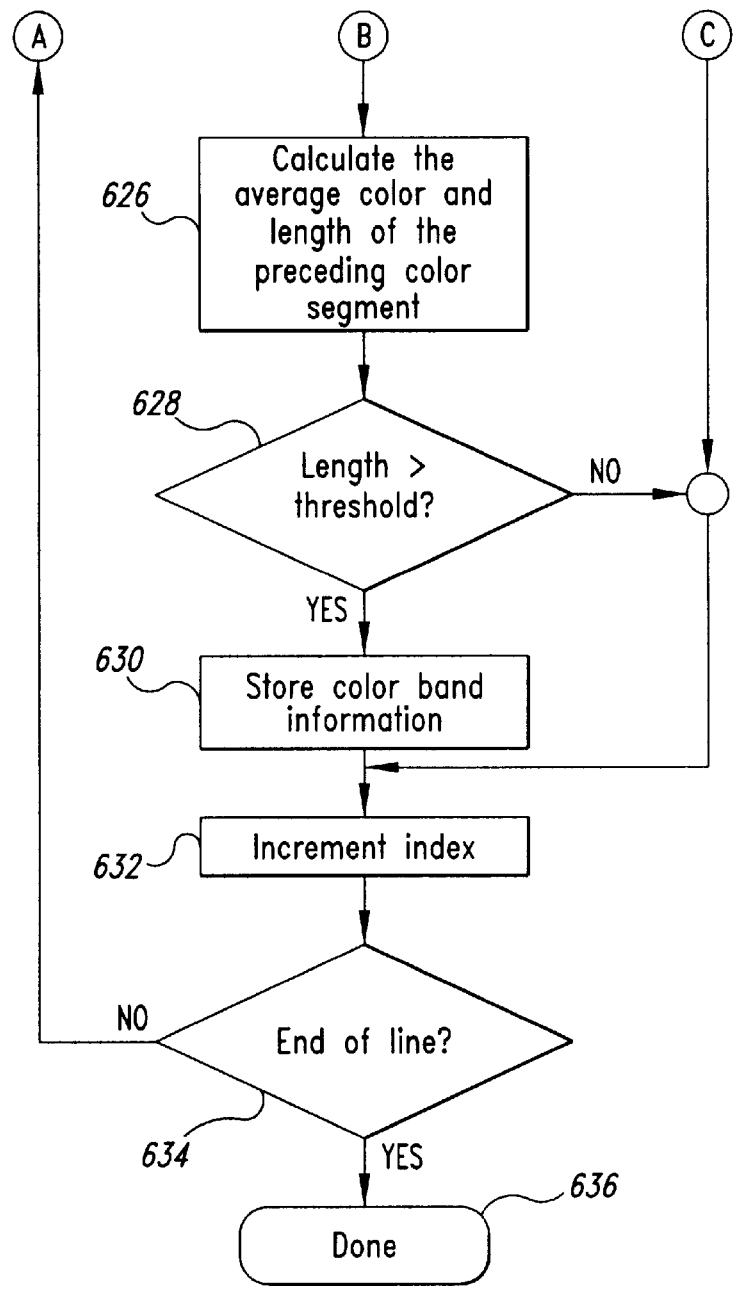
Figure 24:
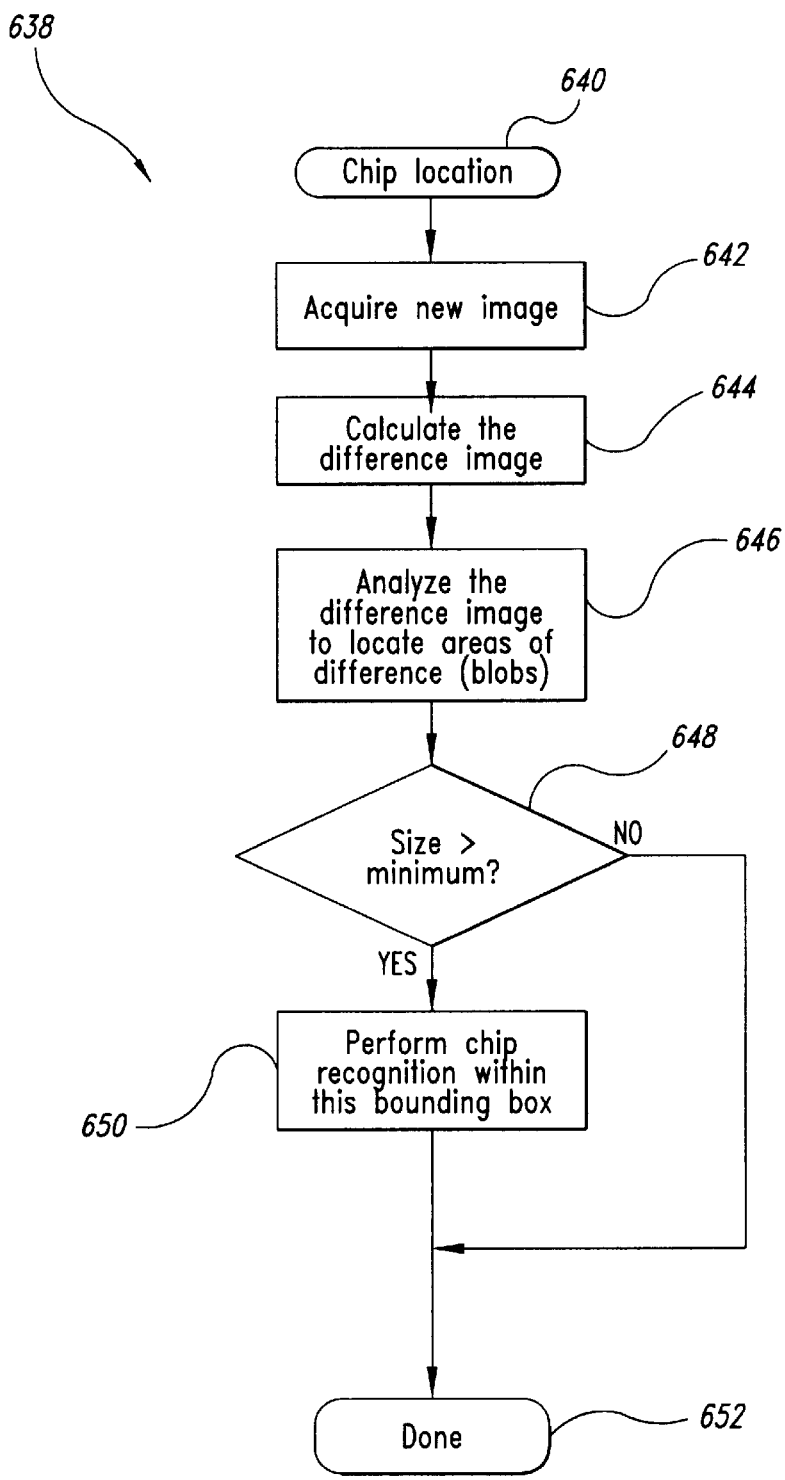
FIG. 24 is a flowchart of a method of the present invention for locating chips in an image of the playing surface of the gaming table.
Figure 25A:
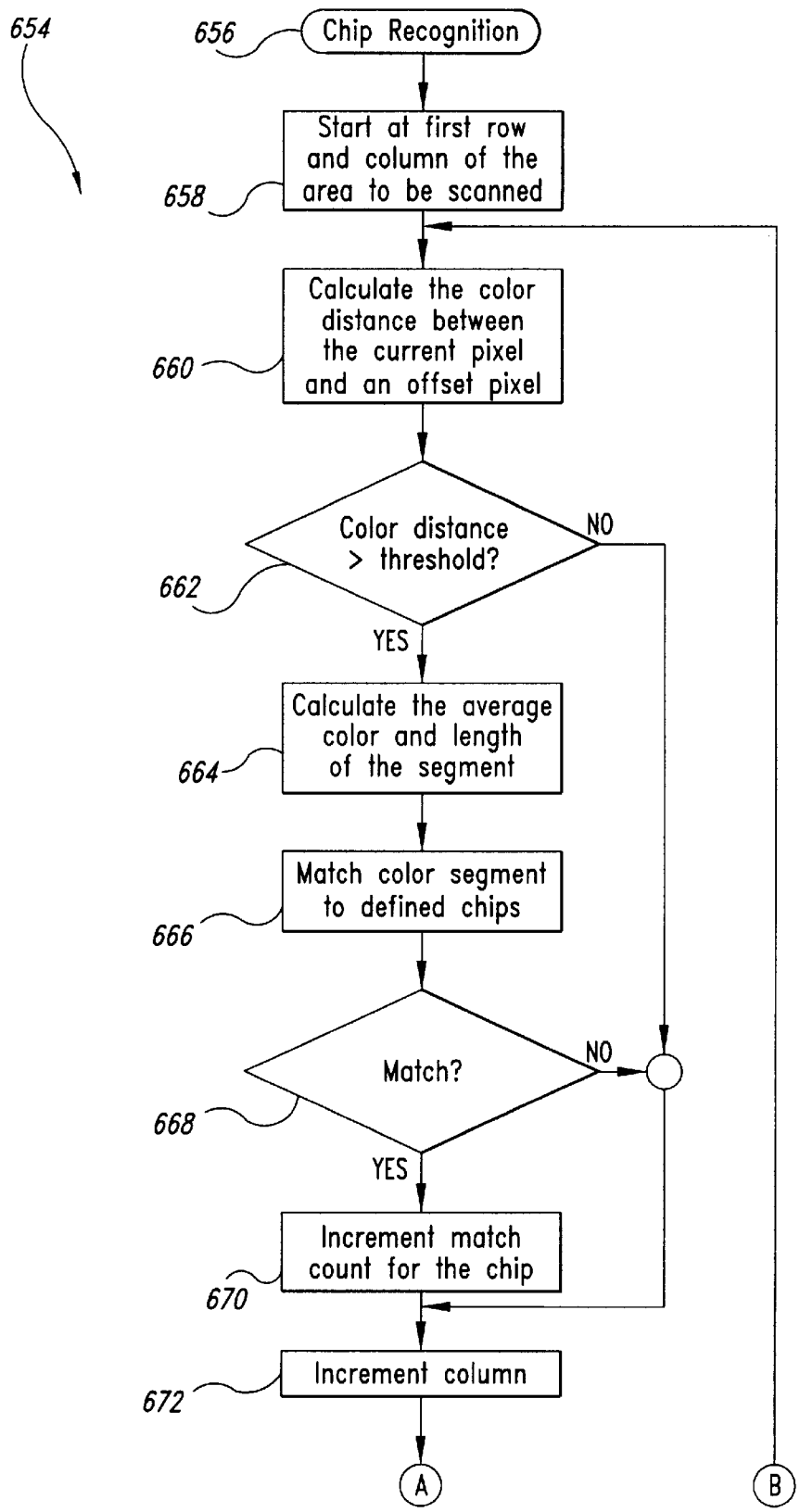
FIGS. 25A and 25B is a flowchart of a method of the present invention for recognizing the various denominations of chips based on the chip patterns.
Figure 25B:
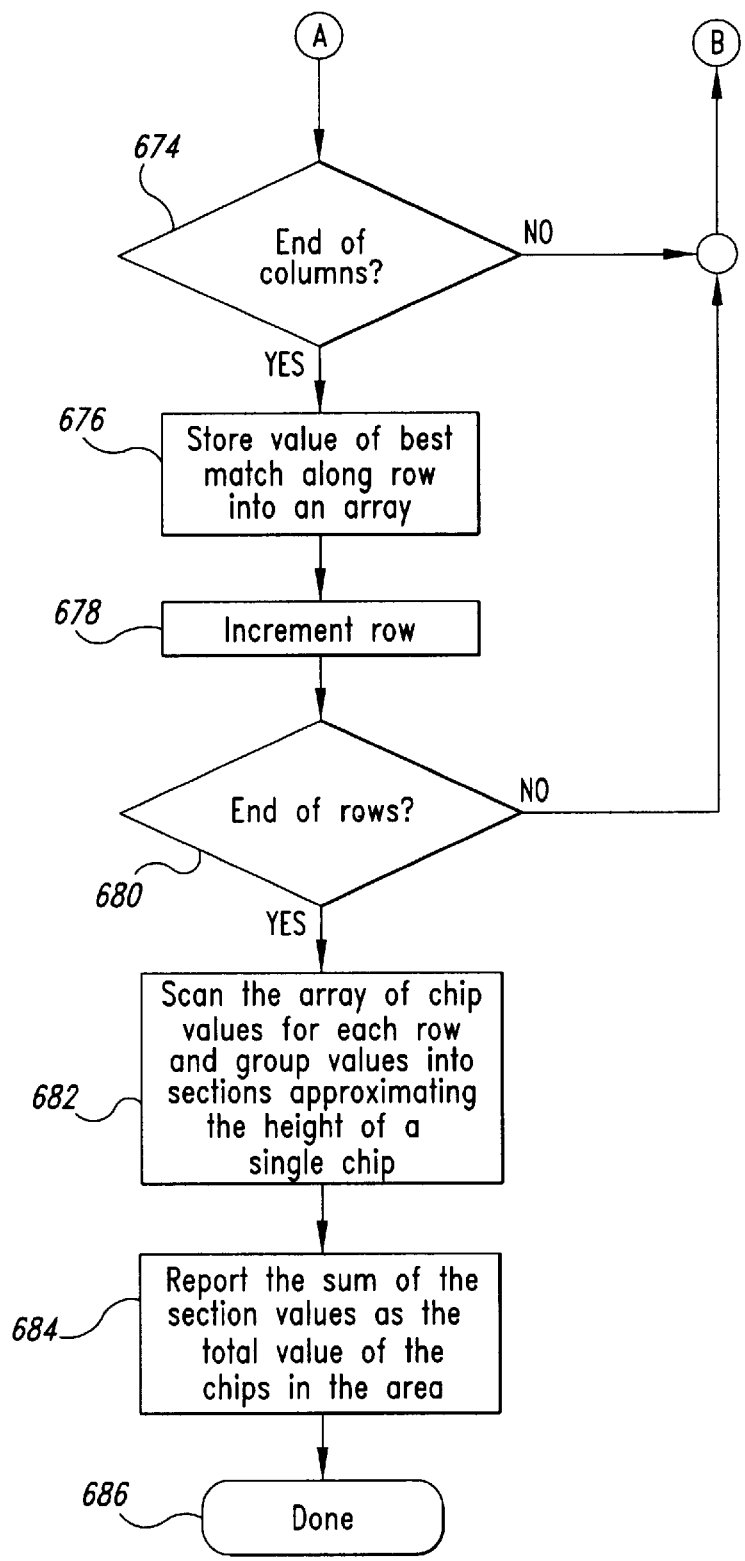

FIGS. 23–25 show methods of implementing the software, including methods for learning new chip patterns (FIGS. 23A and 23B), locating chips in an image of the playing surface of the gaming table (FIG. 24), and recognizing the various denominations of chips based on the chip patterns (FIGS. 25A and 25B).

Learning New Chip Patterns

In FIGS. 23A and 23B, the gaming table CPU 52 starts a training routine 612, at step 614, to add new chip patterns (e.g., a band of colored markings around the edge of the chip) to a set of recognizable chip patterns stored in a memory. The gaming table CPU 52 can start the training routine 612 each time the casino wishes to add a chip pattern to its set of recognizable chip patterns. The new chip pattern can, for example, represent a new chip design for the casino, a new denomination of chips, or a chip from another casino that the first casino wishes to honor, or otherwise identify.

In step 616, the gaming table CPU 52 receives a region-of-interest ("ROI") of an input image, consisting of an edge-on view of the chip. The gaming table CPU 52 can receive the image data from the gaming table CPU 52, or the image data can come from a system dedicated to imaging new chips. In step 618, the gaming table CPU 52 takes an average of the color information for each column of a color pattern carried on the edge 48 (FIG. 2) of the chip 38, and creates a one-dimensional array representation or profile of the color pattern.

The CPU 52 traverses the profile, searching for changes in the color using a color distance operator. To search the profile, the gaming table CPU 52 sets an index to a first entry in step 620, and calculates the color distance between the current entry and the entry at an offset in step 622. The color distance operator returns a scalar value that is the linear distance between two colors in a three dimensional color space (i.e., the square root of the sum of the squares of the differences in each color plane). If the gaming table CPU 52 detects a change in the color greater than a predefined threshold in step 624, the gaming table CPU 52 calculates the length and average color for the preceding color segment in step 626. If the length exceeds a threshold length in step 628, the gaming table CPU 52 stores the length and average color in step 630. The gaming table CPU 52 increments the index in step 632, and repeats the steps until the gaming table CPU 52 detects an end of line in step 634, concluding the routine 612 at step 636. Optionally, the gaming table CPU 52 can compare the color band information to ensure that the new chip has a unique color scheme.

Locating Chip Positions

In FIG. 24, the gaming table CPU 52 starts a chip locating routine 638, at step 640, to locate one of the wager chips 22 in the color image of the gaming table 10. The gaming table CPU 52 acquires a new color image in step 642, and calculates the difference between the new color image and a previous color image in step 644. The gaming table CPU 52 uses intensity planes of the color images, subtracting each successive image from the background image to obtain a gray level image. In step 646, the gaming table CPU 52 analyzes the difference image to locate areas of difference or "blobs." Higher gray level values indicate points of greater difference between color images. In step 648, the gaming table CPU 52 applies a threshold to the difference image, and runs a morphological or blob algorithm. The resulting binary image determines the bounding boxes around the areas of significant difference. These boxes will contain any wager chips 22 in the field-of-view but may also contains areas of difference having no associated chips. In step 650, the gaming table CPU 52 performs chip recognition within the bounding box, and terminates execution in step 652.

Recognizing Chips

In FIGS. 25A and 25B, the gaming table CPU 52 starts a chip recognition routine 654, at step 656, to determine a number and total value of wager chips 22 wagered, from the color image of the gaming table 10.

In step 658, the gaming table CPU 52 starts at the first row and column of the ROI that may contain wager chips 22 and scans across the row looking for changes in color. In step 660, the gaming table CPU 52 calculates the color distance between a current pixel and an offset pixel, using the color distance operator described above. In step 662, the gaming table CPU 52 compares the color distance to a threshold value to detect a change in color. If the gaming table CPU 52 detects a change in color (i.e., color distance>threshold), the gaming table CPU 52 calculates the average color and length of the segment in step 664.

In step 666, the gaming table CPU 52 compares the length and color of each color segment to a list of segments for each of the recognizable chip patterns stored in memory. If the gaming table CPU 52 finds a match in step 668, the gaming table CPU 52 increments a match count for the wager chip 22 in step 670. The gaming table CPU 52 increments the column index in step 672, and repeats the process until the gaming table CPU 52 detects an end of the column in step 674. The gaming table CPU 52 stores the value of the best match along the row into an array in step 676. The gaming table CPU 52 increments a row index in step 678, and repeats the process until the gaming table CPU 52 detects an end of the rows in step 680. At the end of the each row, the value of the chip with the highest match count is stored in the array, using the row as an index into the array. Depending on the resolution of the image, each wager chip 22 is represented by one or more rows.

In step 682, the gaming table CPU 52 scans the array of values and groups the rows with equal values into segments of approximately the same height as a wager chip 22. This permits the gaming table CPU 52 to determine the number and total value of the wager chips 22 in the image. The number and total value of the wager chips 22 are reported in step 684, and the routine 654 terminates at step 686.

Bank Inventory Tracker Software Module

As shown in FIG. 16, the bank inventory tracker software module 700 interacts with the hardware elements of the cash accounting and verification subsystem 64 (FIG. 3) to perform the cash box processing function 310 (FIG. 15) by authenticating items 41 of value placed in the drop box 40

(FIG. 1), and determining the denomination of those items, including chips, currency, and other items of value. The processor/controller PCB 160 (FIG. 14) executes the bank inventory tracker software module 700.

Figure 26A:
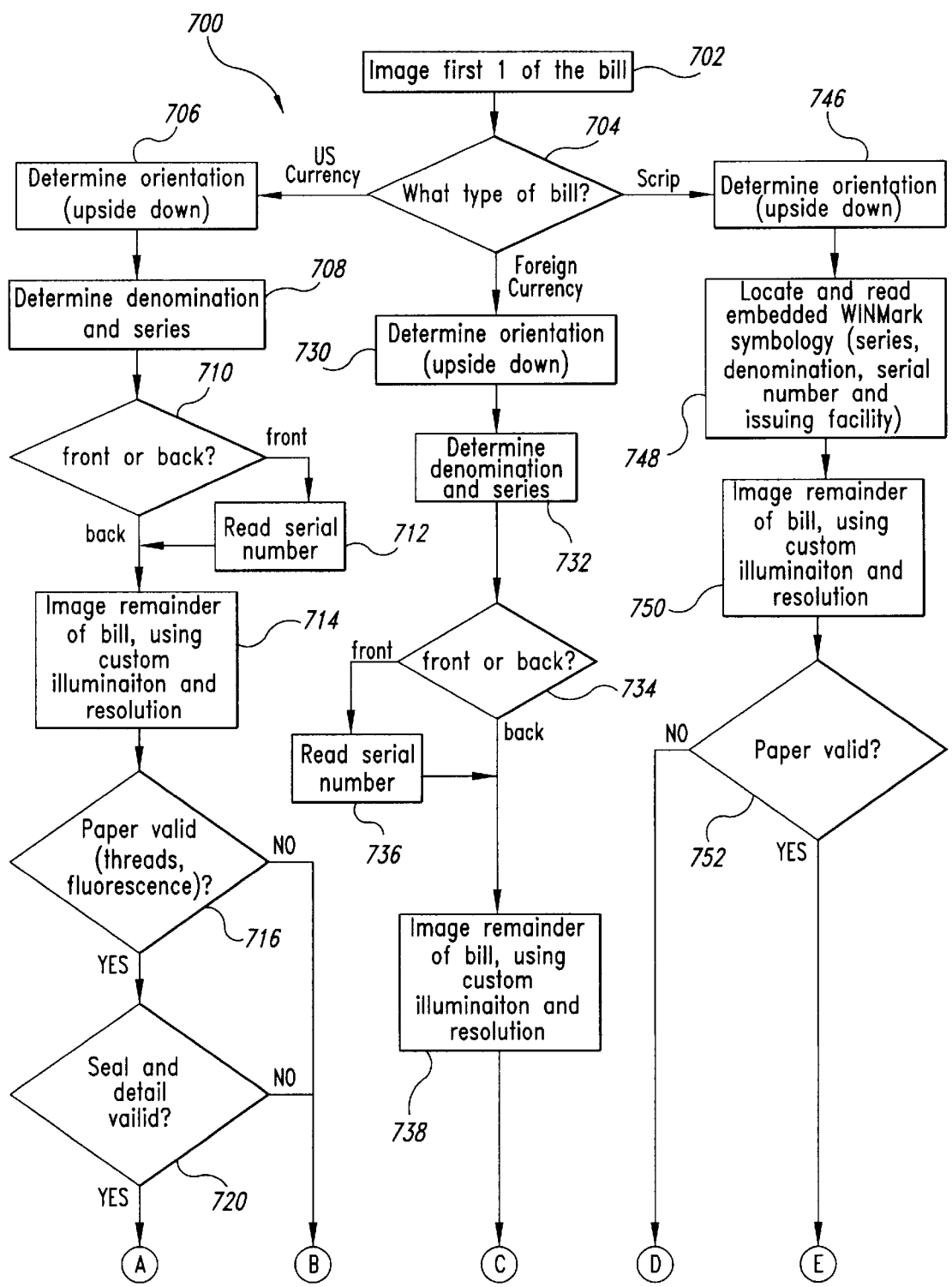
FIGS. 26A and 26B is a flowchart of a method of the present invention for tracking the contents of a bank.
Figure 26B:
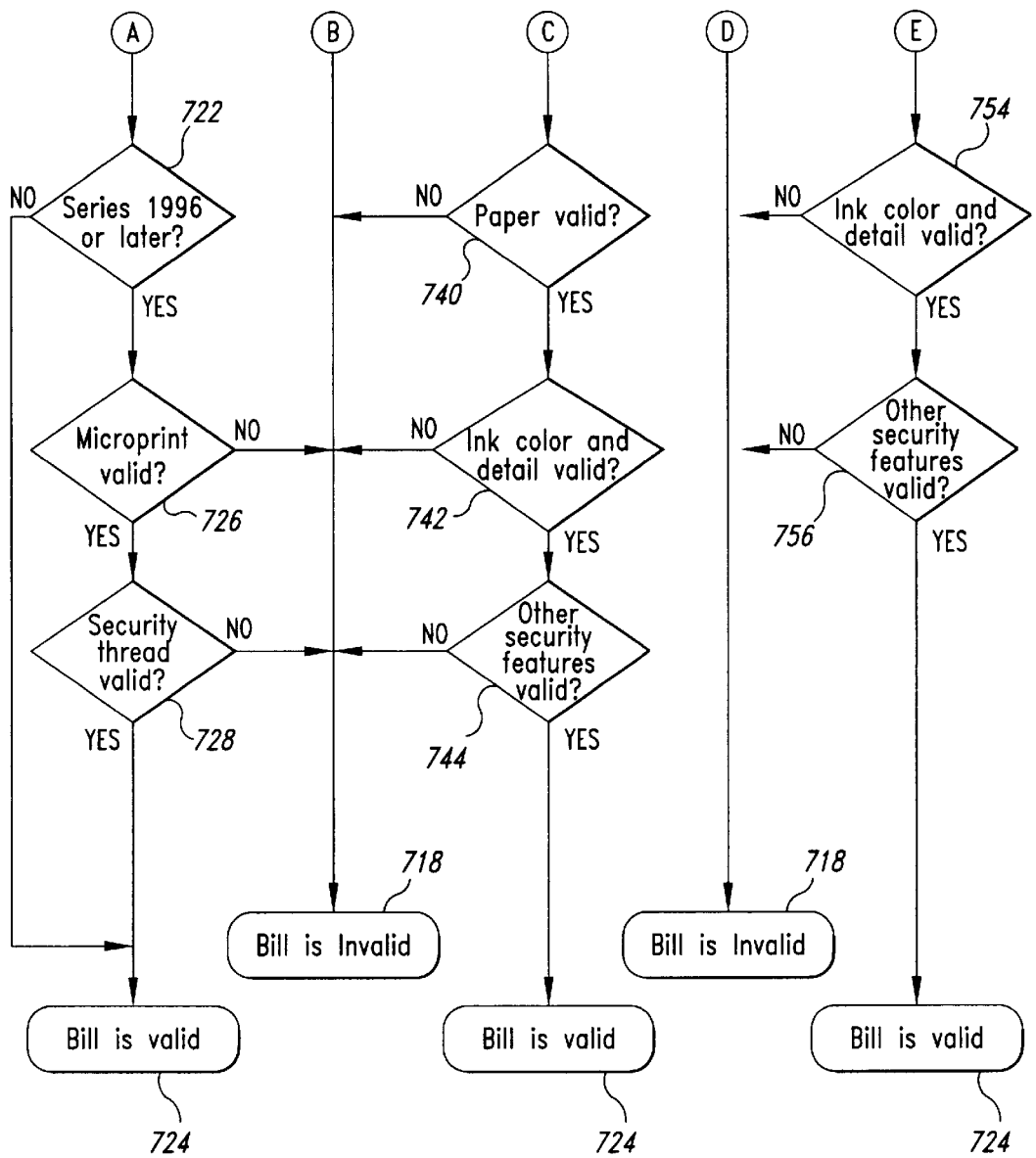

FIGS. 26A and 26B show the image sensor 158 (FIG. 14) imaging a portion of the item 41 of value (FIG. 1) in step 702 (e.g., a bill). The DSP CPU 162 processes the image pixel data, and compares the resulting image data with image data corresponding to a number of known items of value to identify a type for the item 41 of value. In step 704, the processor/controller DSP CPU 162 branches control based on the type, to perform checking appropriate for the particular type of item 41.

If the DSP CPU 162 recognizes the item as U.S. currency, the DSP CPU 162 first determines an orientation of the item 41 in step 706, and determines the denomination and series of the item 41 in step 708. The denomination represents the value or amount of the item 41. The series identifies the date that the item 41 was printed or the group to which the item 41 belongs. The series can indicate presence or absence of certain security features in the item 41, for example microprinting, or a security thread or band. The DSP CPU 162 can also use the series to help verify a serial number carried by the item 41. In step 710, the DSP CPU 162 determines whether the image sensor 158 is imaging a front or a back of the item 41. If image sensor 158 is imaging the front of the item 41, the image sensor 158 reads a serial number printed on the front of the item 41 in step 712.

In step 714, the image sensor 158 images other portions of the item 41 using varying levels and types of illumination, as well as varying levels of resolution. The portions of the item 41 are generally selected for their inclusion of security features. While the location of these security features for each item type are defined in a memory, the DSP CPU 162 can randomly or pseudo-randomly vary the particular security features examined and/or the portions of the security features that it examines to make forgery more difficult. For example, the DSP CPU 162 can select the portion of the item 41, the security feature, or the portion of the security feature from a list of suitable portions, security features or portions of security features. The list can be specific to the item type, for example, a one list for U.S. currency and another list for a foreign currency. The selection can be truly random, or can simply alternate among a number of defined portions to appear random to a counterfeiter. The DSP CPU 162 selects the particular level and type of illumination, and selects the resolution according to the particular security feature being examined. The DSP CPU 162 selects the illumination and resolution characteristics for the particular item type from a set of predefined characteristics in one of the memories.

In step 716, the DSP CPU 162 examines the image data to determine whether the paper is valid. For example, the DSP CPU 162 can identify the number and color of color threads (e.g., blue, red) in a portion of the paper. The DSP CPU 162 can activate a fluorescent illumination source where the security feature relies on fluorescence. If the DSP CPU 162 determines that the paper is not valid, control pass to step 718, indicating an invalid bill has been identified. In response, the DSP CPU 162 or some other controller can reject the item and/or provide a suitable warning. In step 720, the DSP CPU 162 examines the seal and other details of the item 41 to determine the item's validity. If invalid, control again passes to step 718 identifying the invalid item.

In step 722, the DSP CPU 162 determines if the item 41 is from the 1996 or later series. If the item 41 is from a series before the 1996 series, the DSP CPU 162 stops testing, concludes the item 41 is valid, and passes control to step 724 identifying the item 41 as valid. If the item 41 is from the 1996 series, or a later series, the reader continues testing, examining the micro-print on the item in step 726. Micro-print is a security feature added in the 1996 series to foil forgery using high quality color copiers. If the DSP CPU 160 determines that the micro-print is invalid, control passes to step 718 indicating that the item 41 is invalid. If valid, the DSP CPU 162 examines the item 41 for a security thread or security band in step 728. The security thread or band is a thin strip incorporate in the U.S. currency. If the DSP CPU 162 determines that the security band is invalid, control again passes to the step 718 indicating the item 41 as invalid, otherwise the item 41 is considered valid and control passes to step 724 indicating that the item 41 is valid. The DSP CPU 160 can examine other security features as desired, such as a watermark.

If the item 41 of value is recognized as a piece of foreign currency, the DSP CPU 162 determines the item's orientation in step 730, and the denomination and series of the item 41 in step 732. In step 734, the DSP CPU 162 determines whether the image sensor 158 is imaging a front or a back of the item 41. If image sensor 158 is imaging the front of the item 41, the image sensor 158 reads a serial number printed on the front of the item 41 in step 736.

In step 738, the image sensor 158 images other portions of the item 41 using varying levels and types of illumination, as well as varying levels of resolution. In step 740, the DSP CPU 162 examines the image data to determine whether the paper is valid. In step 742, the DSP CPU 162 examines the image data to determine whether the ink color and detail are valid. In step 744, the DSP CPU 162 examines other security features specific to the currency and determines whether those features are valid. In each case, control passes to step 718 to indicate that the item 41 is invalid if any feature is determined to be invalid. Otherwise control passes to the next sequential step, until all tests are complete and the item 41 is determined valid in step 724.

If the item of value 41 is recognized as a piece of scrip, for example valuable paper issued by the casino, the DSP CPU 162 determines the item's orientation in step 746. In step 748, the DSP CPU 162 causes the image sensor 158 to locate and read a machine-readable symbol encoding identifying information for the scrip. For example, a bar code symbol can encode the series, denomination, serial number and identification of an issuing facility.

In step 750, the image sensor 158 images other portions of the item 41 using varying levels and types of illumination, as well as varying levels of resolution. In step 752, the DSP CPU 162 examines the image data to determine whether the paper is valid. In step 754, the DSP CPU 162 examines the image data to determine whether the ink color and detail are valid. In step 756, the DSP CPU 162 examines other security features specific to the currency and determines whether those features are valid. In each case, control passes to step 718, indicating that the item is invalid if any feature is determined to be invalid. Otherwise control passes to the next sequential step, until all tests are complete and the item 41 is determined valid in step 724.

Play Tracking Software Module

FIG. 16 shows the play tracking and coordination software module 800 receiving data and signals from the various other software modules to determine the occurrence and identity of the game events, as well as, the player wagering and identity of player's cards 30. Thus, the play tracking and coordination software module 800 performs the table monitoring logic function 302 (FIG. 15).

Figure 27:
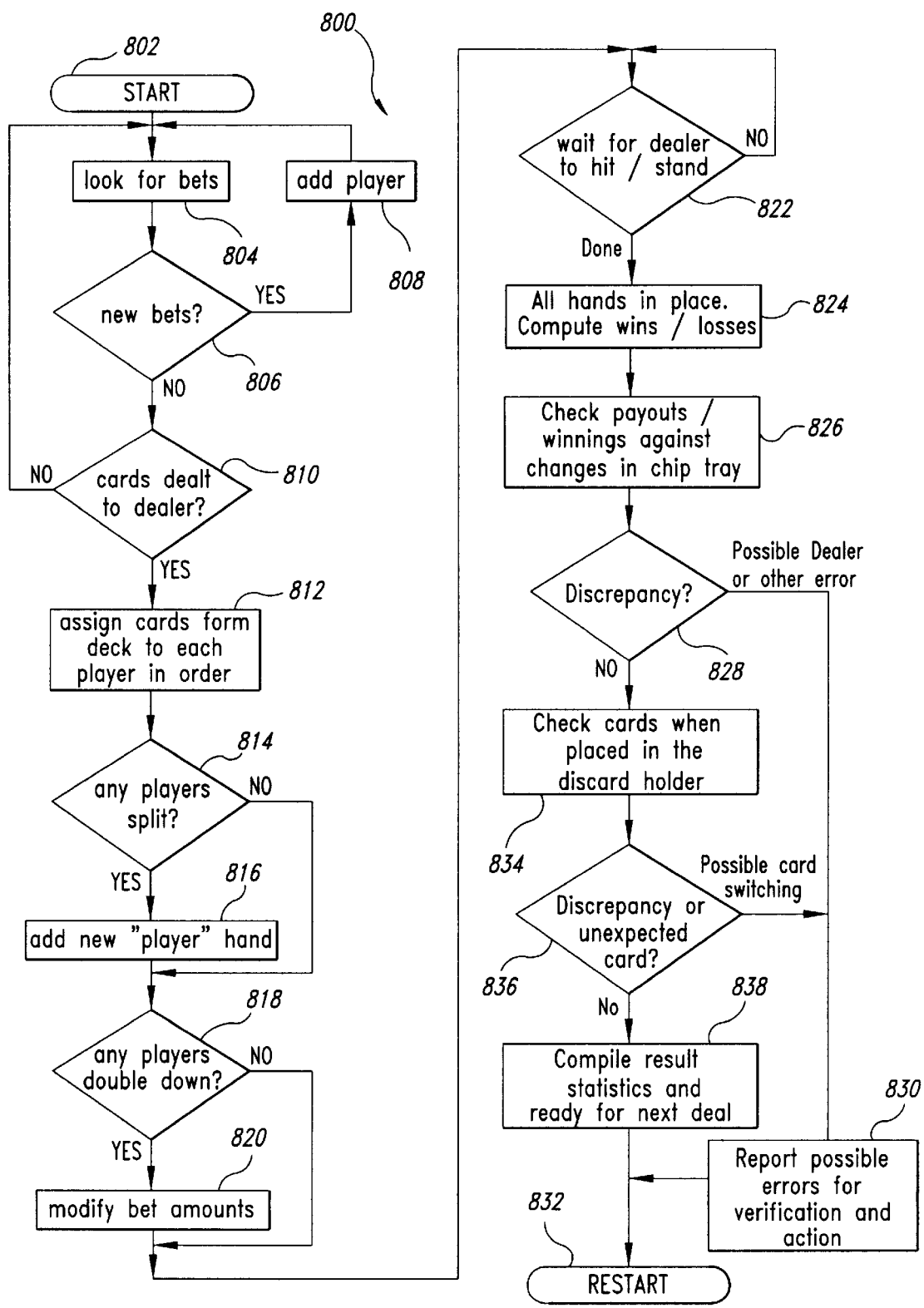
FIG. 27 is a flowchart of a method of the present invention for play tracking and coordination.

FIG. 27 shows a simplified flowchart the play tracking and coordination software module 800 for monitoring the gaming table 10 when used for a blackjack game. For the sake of clarity, FIG. 27 does not represent several parallel processes, such as monitoring the chip tray 36 and the drop box 40 that are identified in other FIGS. The gaming table CPU 52 starts the play tracking and coordination software module 800 in step 802. The appearance of one or more wager chips 22 (FIG. 1) in the wager circle 24 on the gaming table 10 may trigger the start of the play tracking and coordinate software module 800.

In step 804, the gaming table CPU 52 determines whether there are any wager chips 22 on the gaming table 10 (FIG. 1). Typically, the gaming table 10 will have a demarcated area for wagering, for example the wager circles 24 in front of each player position. Any wager chips 22 within the demarcated area constitute a wager, while chips not within the wager circles 24, such as chips 28, 38 are not a part of any wager. The gaming table CPU 52 relies on data from the identify wagers software module 400 (FIG. 16) to identify the wager chips 22. If there are wager chips 22, the gaming table CPU 52, in step 806, determines if any of the wager chips 22 are new. If the gaming table CPU 52 locates a new wager chip 22, the gaming table CPU 52 causes a player to be added in step 808. If the gaming table CPU 52 does not locate new wager chips and hence a new player, the gaming table CPU 52 determines whether cards 32, 34 have been dealt to the dealer 12 in step 810. The gaming table CPU 52 relies on data from the identify dealt cards software module 450 (FIG. 16) to identify the appearance of the dealt cards 32, 34. If the cards 32, 34 have not been dealt to the dealer 12, the gaming table CPU 52 returns to step 804, again checking for wager chips 22.

If cards 32, 34 have been dealt to the dealer 12, the gaming table CPU 52 in step 812, determines the identity of the cards 30 held by each of the players 14, 16 and the dealer 12. The gaming table CPU 52 relies on the information from the card order reading software module 500 (FIG. 16) that identifies the value of each card in the order that the card appears in the deck 18. By tracking the appearance of cards 30–34 on the gaming table 10, the gaming table CPU 52 can match the order of appearance and the order of the card deck 18 to determine the value of the cards 30–34 held by the players 14, 16 and the dealer 12.

In step 814, the gaming table CPU 52 determines whether any player has split their hand. Again, the gaming table CPU 52 is relying on data from the identify dealt cards software module 450 (FIG. 16) to identify the appearance and location of cards 30 on the table. The play tracking subsystem 56 can determine when one of the cards 30 has been moved from a first position representing one hand, to a second position representing a second hand. In step 816, the gaming table CPU 52 adds a "new" player if any player has split their hand. In step 818, the gaming table CPU 52 determines whether any of the players 14, 16 have "doubled down" their wager chips 22. The play tracking subsystem 56 can determine when wager chips 22 have been moved from a first position to a second position representing the doubling down. In step 820, the gaming table CPU 52 appropriately modifies the wager amounts if any of the players 14, 16 doubled down.

In step 822, the gaming table CPU 52 waits for the dealer 12 to take an additional card or to stand. In step 824, the gaming table CPU 52 computer determines the wins and losses based on its knowledge of the value of each card held by the player 14, 16 and the dealer 12. In step 826, the gaming table CPU 52 checks the calculated winnings to be paid out and losses against the changes to contents of the chip tray 36. The gaming table CPU 52 determines whether there is a discrepancy in step 828, reporting any possible error in step 830 for possible verification and action, and finishing execution at a restart step 832. If the gaming table CPU 52 discovers a discrepancy in the order of the cards in the discard holder, or an unexpected card, the gaming table CPU 52 reports the error in the step 830.

If gaming table CPU 52 does not detect a discrepancy, the gaming table CPU 52 checks cards placed in a discard holder (not shown). If gaming table CPU 52 discovers no discrepancy in step 836, the gaming table CPU 52 compiles a set of result statistics in step 838, and prepares for a next hand or game by passing control to the restart step 832.

Integrated Casino System

Figure 28:
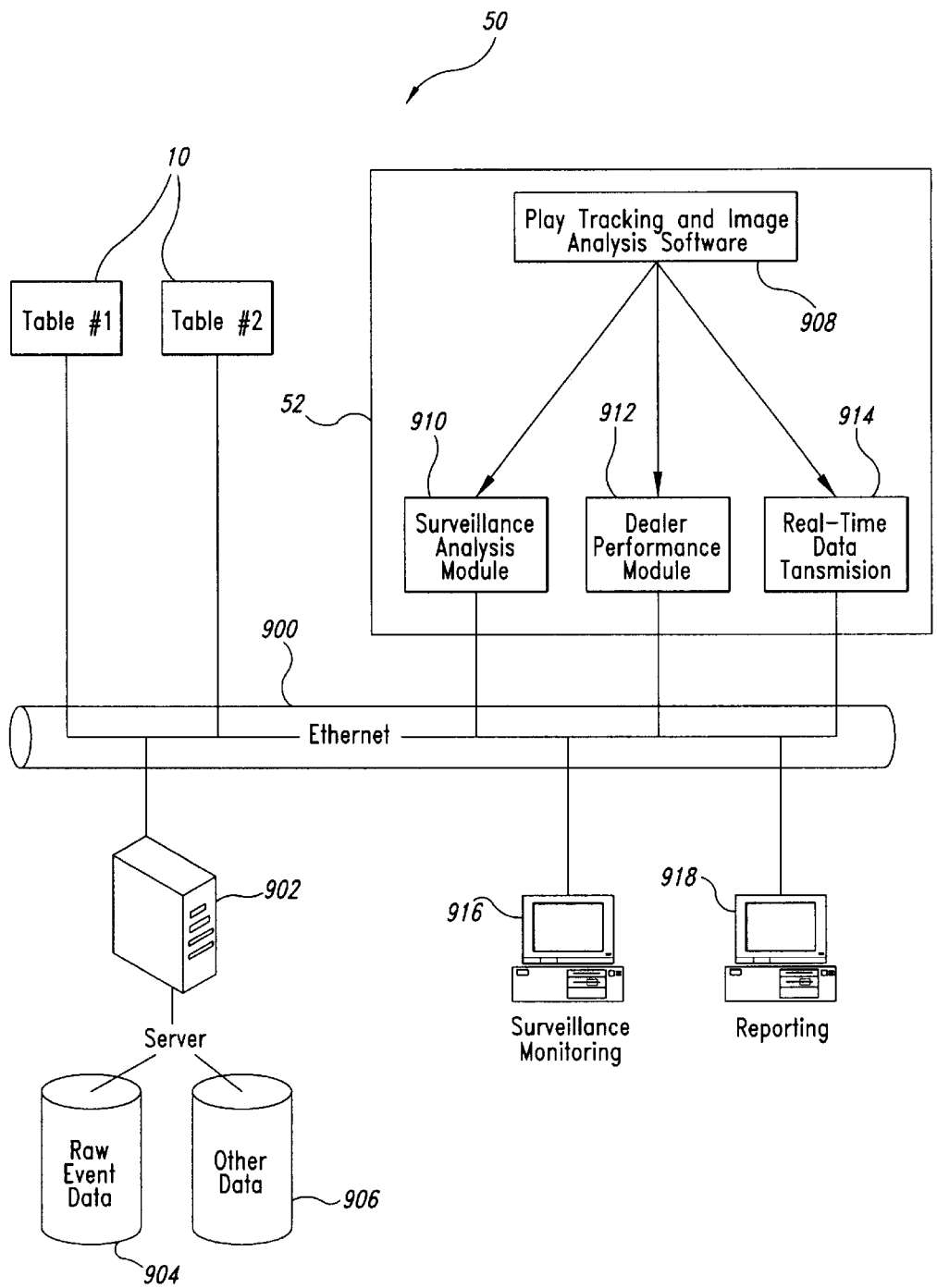
FIG. 28 is a block diagram of a network of gaming tables.

A number of gaming tables 10 are shown in FIG. 28 networked over a computer network, such as an Ethernet LAN 900 to a server 902 and a central database including raw event data 904 and other data 906. The gaming table CPU 52 executes play tracking and image analysis software 908 for each gaming table 10, and can execute a software module 910 for performing surveillance analysis, a software module 912 for performing dealer performance evaluations and a software module 914 for performing real-time data transmission. Additional computers 916, 918 can access the information in the central database to perform surveillance monitoring and reporting, respectively. The networking of gaming tables 10 provides a number of benefits, such as casino-wide, real-time accounting, casino-wide tracking of players, and real-time progressive gaming, as described in detail below.

Figure 29:
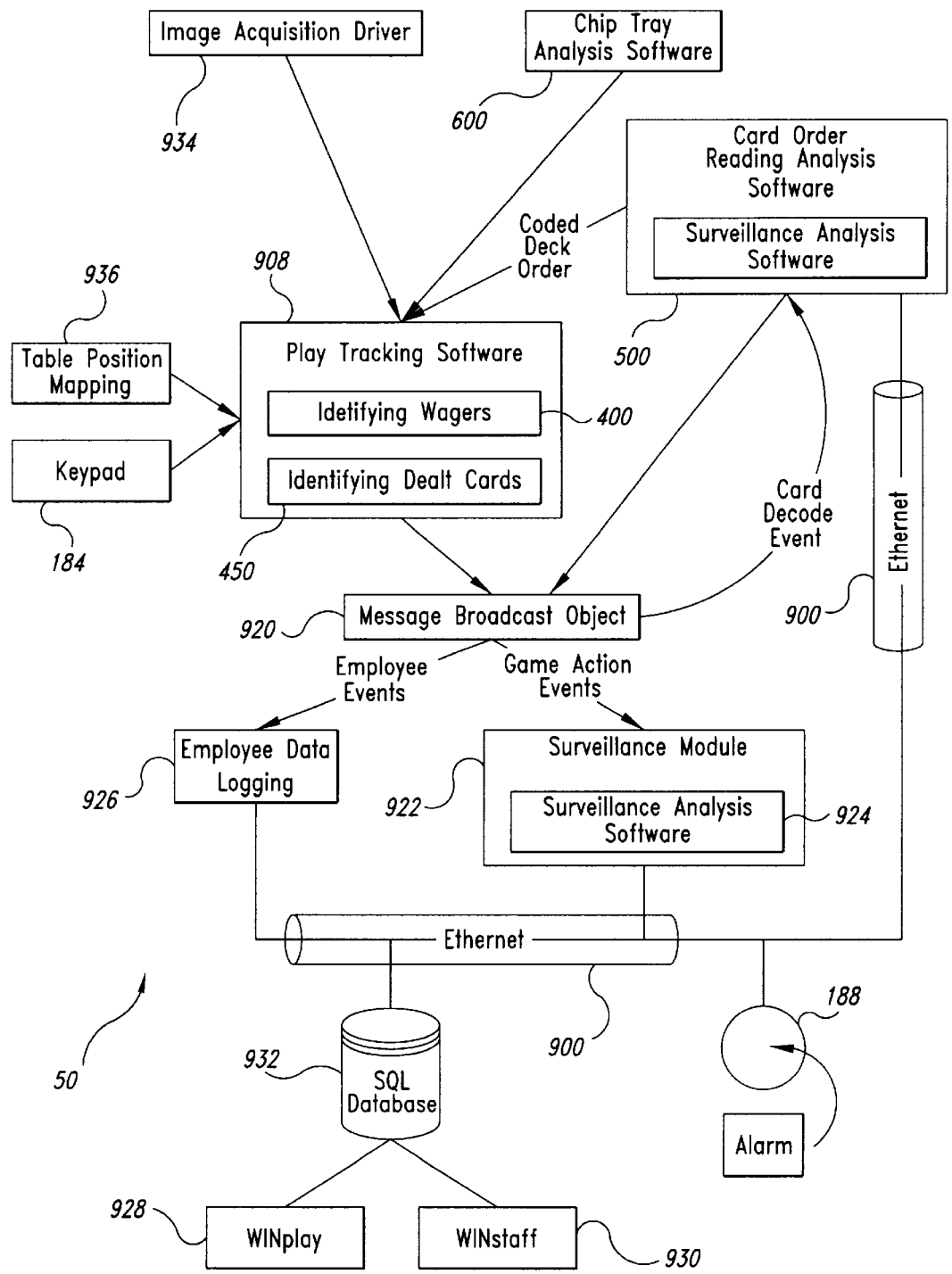
FIG. 29 is a block diagram of the operation of a networked gaming table of FIG. 28.

FIG. 29 shows the operation of one of the networked gaming tables 10. The play tracking software 908 broadcasts a series of messages 920 that indicate the events detected on the gaming table 10 to the other software modules. For example, the play tracking software 908 broadcasts a card decode event each time a new card is detected on the playing surface 26 (FIG. 1). The card order reading software module 500 receives the message and decodes the symbol of the respective card 19 to identify the rank and suit of the card. Similarly, a broadcast of game action events causes a surveillance module 922 to execute surveillance analysis software 924 to detect suspect playing and wagering patterns. The broadcast of an employee event (e.g., changing dealers at a gaming table, etc.) triggers an employee data logging 926. The monitoring system 50 stores play information 928 and employee information 930 in a database 932. An image acquisition driver 934 drives the image acquisition, while a table position mapping module 936 interacts with the play tracking and image analysis software 908 to locate the position of wager chips 22 and cards 30–34 on the gaming table 10.

Player Profiling and Identification

To create a comprehensive player profile, the monitoring system 50 tracks players 14, 16 from gaming table 10 to gaming table 10, or from time to time at the same gaming table 10. The monitoring system 50 can rely on some, or all, of a variety of player tracking methods to identify players 14, 16 as they move between gaming tables 10, or as the player 14, 16 resumes playing after a period of inactivity (e.g., a few minutes, days, months, or years).

Some players 14, 16 will present a player identity or "comp" card (not shown), that contains player identifying information. The ability to receive complimentary benefits provides an incentive for the players 14, 16 to present such a card. The card may include identifying information, such as a name, address, and/or a unique serial number encoded in a magnetic stripe on the card.

Some players 14, 16 are reluctant to present such identifying information to the casino, especially players that are employing prohibited tactics. The system employs other methods for identifying these players 14, 16, for example, automated facial recognition. Video cameras 5 (FIG. 1) at the gaming tables 10 provide images of the players 14, 16 at each playing position. The monitoring system 50 can process the image data, and compare the image data taken at different times to match facial characteristics, such as hair color, eye color, the presence of facial hair, or other facial features. The monitoring system 50 can use the matching to uniquely associate the player 14, 16 with an identity. Alternatively, the monitoring system 50 can use the matching to identify the player 14, 16 as being the same player who played at a different gaming table 10 or at the same gaming table 10 at a different time. It is not necessary to identify a player by name to build a player profile. For example, the monitoring system 50 can track a non-identified player across a number of gaming tables 10 to establish a pattern of prohibited playing strategies. The particular player 14, 16 can then be asked to leave the casino without ever specifically identifying the offending player by name.

A still further method of identifying players 14, 16 is through the tracking of wager chips 22. Each chip can have a unique serial number. The monitoring system 50 associates a wager chip 22 with a player 14, 16 when the player initially receives chips at the casino's bank. The monitoring system 50 scans the chips 38 in the chip tray 36 after each hand or round. The monitoring system 50 can employ a knowledge of the chip contents of the chip trays 36 to track the path of a particular chip, from gaming table to gaming table, and to some extent, from player to player. While such information may not absolutely identify a player 14, 16, it can eliminate some players and increase the probability of correctly identifying a particular player 14, 16.

For example, the monitoring system 50 can record an association between the first player 14 and the identifiers of a number of chips initially issued to the first player 14 by the casino. The monitoring system 50 can then identify the first player 14 at a first one of the gaming tables 10, through the "comp" card, facial recognition and/or the appearance of one or more of the issued chips in the chip tray 36 at the first table. The monitoring system 50 can ascertain the identity of the second player 16 at a second one of the gaming tables when a wager chip 22 lost by the first player 14 at the first gaming table 10 turns up in the chip tray 36 at the second gaming table. Once the wager chip 22 disappears from the chip tray 36 at the first gaming table 10, the monitoring system 50 assumes that one of the winning players at the first gaming table received the chip lost by the first player 14. Facial recognition may eliminate one or more of the winning players 16, allowing the monitoring system 50 to identify the player 16 through the combination of chip tracking and/or facial recognition.

Progressive Gaming

The networked monitoring system 50 of FIGS. 28 and 29, permits the playing of a progressive game in real time, based on the outcomes of games on multiple gaming tables 10. Thus, the financial performance of each gaming table 10 can be linked. For example, a payout for a winning player 14, 16 at one of a group of gaming tables 10 may be increased over the normal table odds after a period of losses at the group of gaming tables, or based on an entire amount of losses at the group of gaming tables. Thus, as time goes on the size of the payout increases, or a jackpot grows.

Simulated Representation of Actual Gaming Environment

Figure 30:
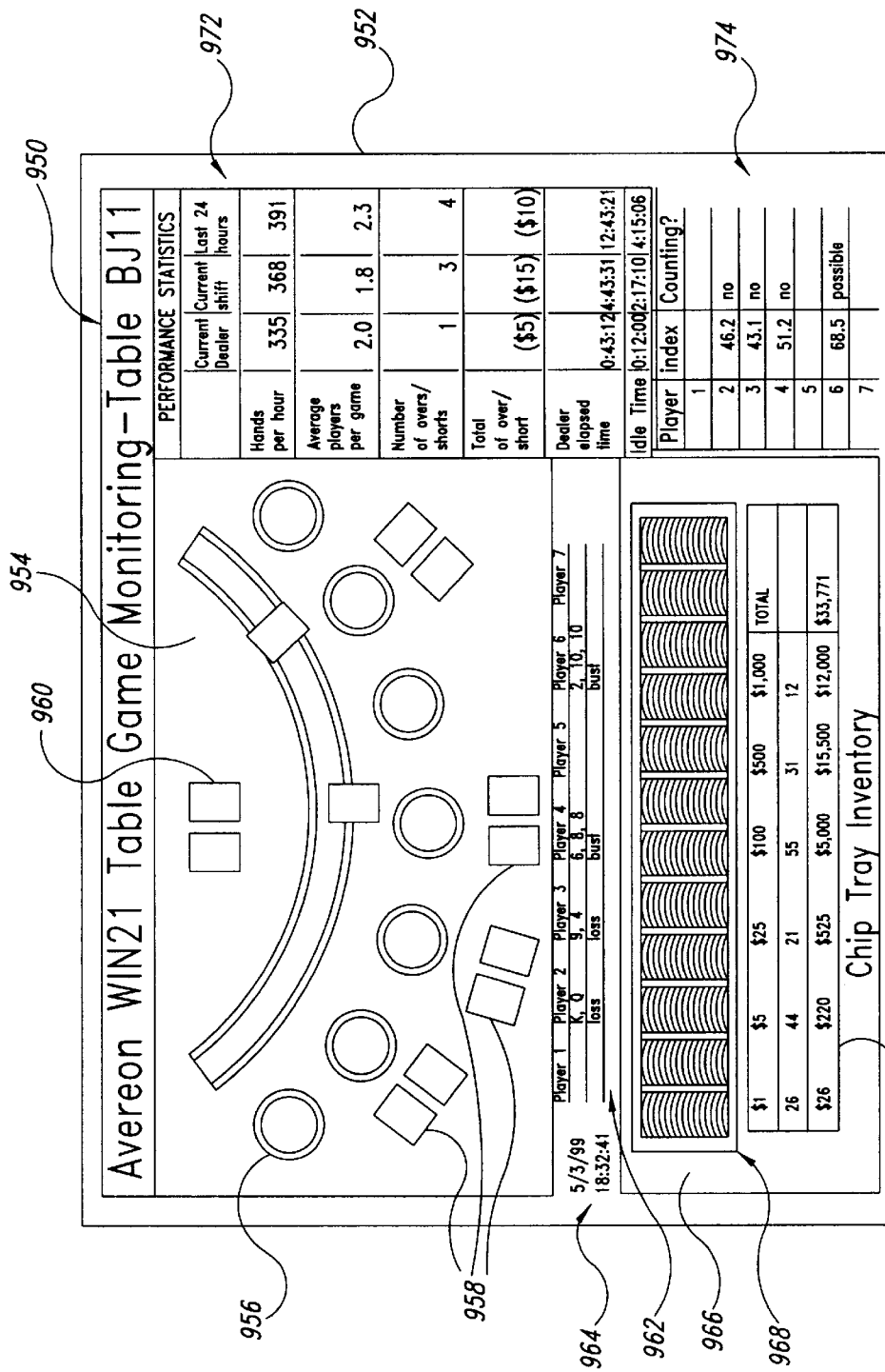
FIG. 30 is a graphical representation of a display of simulation of an actual gaming environment on a monitor using the present invention.

FIG. 30 shows a simulation 950 of an actual gaming environment on a monitor 952. The simulation 950 includes a graphical representation of the playing surface 954, including a graphical representation of the wager chips 956 placed by the players 14, 16 (FIG. 1) at the various playing positions and a graphical representation of the cards 958 dealt to those players and the cards 960 dealt to the dealer 12, represented at a given point in the game. While the player's cards 958 are typically faced down during play, the monitoring system 50 knows the identity of the cards 958, 960, so the graphical representation can show the rank and suit of each of the cards 958, 960 marked on the graphical representations of the cards 958, 960. The player's hands can also be represented as a chart 962, and a date and time of day displayed 964.

The simulation 950 also includes a graphical representation of the chip tray 966 and the chip 968 contents of the chip tray at the given point in the game. The simulation can include a representation of the number of chips of each denomination, as well as total amounts for each denomination of chip and for the entire chip tray in a chart 970.

The simulation 950 can further include a table of statistics 972 for the is players, table and dealer. These statistics are computed by the gaming table CPU 52. Additionally, the simulation can include a graphical representation of the playing patterns of the individual players at each of the playing positions (numbered 1–7) in table form 974, along with a prediction on whether the player is employing a prohibited strategy, such as card counting. The monitor 952 can be at the gaming table 10 and/or at a central security station, or elsewhere in the casino to be monitored by casino security personnel.

System Summary

The above description sets out a non-intrusive system to record and analyze data for accounting, marketing and/or financial purpose. Further details are set out in applicants' U.S. provisional patent application, Serial No. 60/130,368, filed on Apr. 21, 1999, and entitled "TRACKING SYSTEM FOR GAME OF CHANCE."

Figure 31:
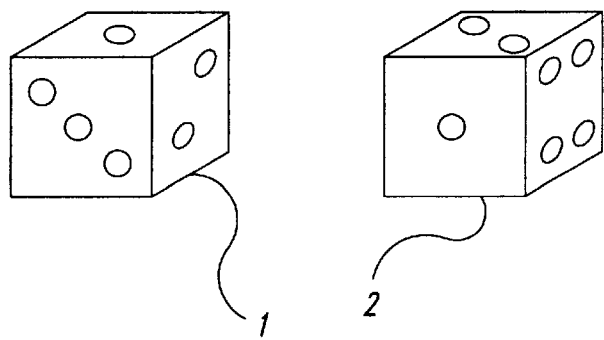
FIG. 31 is an isometric view of a pair of die, forming the gaming pieces for the gaming table.
Figure 32:
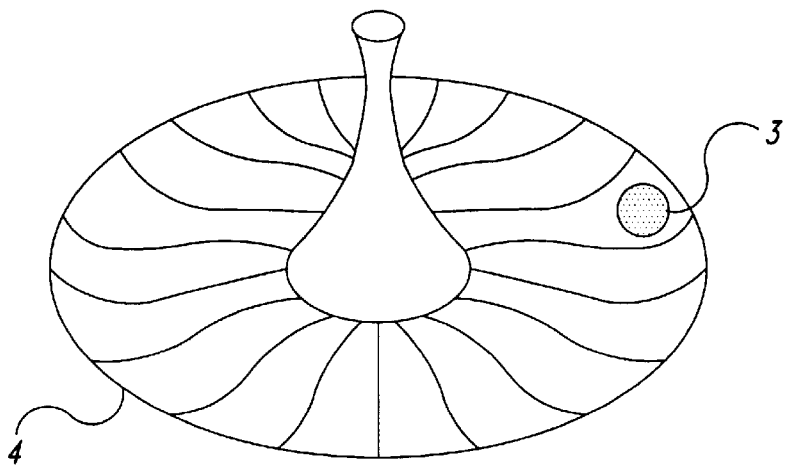
FIG. 32 is an isometric view of a roulette wheel, forming the gaming piece for the gaming table.
Figure 33:
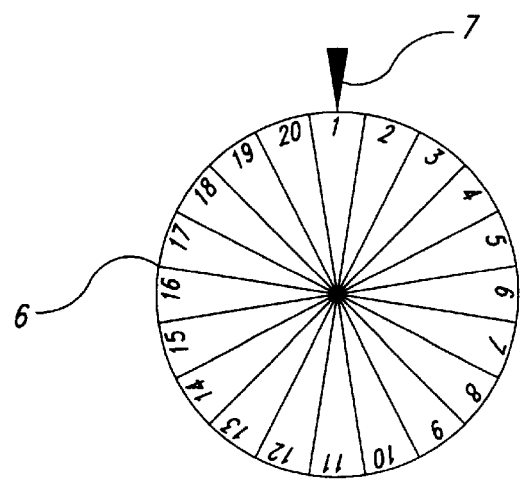
FIG. 33 is an isometric view of a wheel of fortune, forming the gaming piece for the gaming table.

Although specific embodiments of, and examples for, the invention are described herein for illustrative purposes, various equivalent modifications can be made without departing from the spirit and scope of the invention, as will be recognized by those skilled in the relevant art. The teachings provided herein of the invention can be applied to monitoring systems for other wagering games, not necessarily the exemplary blackjack card game generally described above. For example, the table monitoring subsystem can track gaming objects other than cards, such as dice 1, 2 shown in FIG. 31, the position of a ball 3 relative to a wheel 4 as shown in FIG. 32, or the position of a wheel of fortune 6 relative to a pointer 7 as shown in FIG. 33. In each case, image data of the gaming object is compared at successive periods of time to determine the outcome of the game play. This image data can be combined with image data corresponding to the wagers placed by the players to determine the amounts won or lost by the players. These amounts can be compared with the changes to the amounts in the chip tray based on the comparison of successive images of the chip tray.

The system can employ other methods of automatically tracking the contents of the chip tray, and the identity and position of the gaming objects. For example, the chips and/or the gaming objects can have symbols other than optically detectable symbols, for example magnetic stripes, encoding the identifying information. The system would then include magnetic readers in addition to, or instead of optical readers such as imagers, scanners and other image capture devices.

The monitoring system can have a different organization than the illustrated embodiment, combining some functions and/or eliminating some functions. The system can employ some of the disclosed automated components for some functions, while relying on manual methods for other functions. The system can be more centralized, or more distributed, as is suitable for the particular gaming environment.

The various embodiments described above can be combined to provide further embodiments. All of the above U.S. patents, patent applications, provisional patent applications and publications referred to in this specification, including, but not limited to, commonly assigned U.S. provisional patent application, Serial No. 60/130,368, filed on Apr. 21, 1999, and entitled "TRACKING SYSTEM FOR GAME OF CHANCE," and U.S. patent application Ser. No. 09/474,858, filed Dec. 30, 1999, and entitled "METHOD AND APPARATUS FOR MONITORING CASINOS AND GAMING," are incorporated herein by reference in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all gaming monitoring systems and methods that operate in accordance with the claims. Accordingly, the invention is not limited by the disclosure, but instead its scope is to be determined entirely by the following claims.

We claim:

1. A gaming table monitor, comprising:
    a chip tray having a base including a front portion, and a chip carrying surface supported by the base, the chip carrying surface including a number of wells sized to receive chips therein; and
    a first table imaging camera mounted in the chip tray, the first table imaging camera having a first table imaging field-of-view extending outwardly from the front portion of the base.

2. The game table monitor of claim 1 wherein the base includes a rear portion opposed to the front potion, the front portion being taller than the rear portion such that the carrying surface is sloped with respect to a playing surface of a gaming table when the base is located on the playing surface.

3. The game table monitor of claim 1 wherein the first table imaging camera is mounted in the front portion of the side wall.

4. The game table monitor of claim 1 wherein the front portion of the side wall includes at least a first aperture aligned with the first table imaging field-of-view of the first table imaging camera.

5. The game table monitor of claim 1, further comprising:
    a second table imaging camera mounted in the chip tray and having a second table imaging field-of-view extending outwardly from the front portion of the base, the second table imaging field-of-view different from and the first table imaging field-of-view.

6. The game table monitor of claim 1 wherein each of the wells includes a window positioned in the well to expose a portion of a circumference of any chips in the wells, and further comprising:
    a chip reading head coupled to the chip tray having a field-of-view alignable with at least one of the windows.

7. The game table monitor of claim 1, further comprising:
    a second table imaging camera mounted in the chip tray and having a second table imaging field-of-view extending outwardly from the front portion of the base, the second table imaging field-of-view different from and the first table imaging field-of-view; and
    a digital signal processing circuit coupled to receive input signals at an input from the first and the second table imaging cameras and coupled to produce video output signals at an output.

8. A gaming table monitor, comprising:
    a chip tray having a base, a chip carrying surface spaced from the base, and a sidewall extending between the chip carrying surface and the base; and
    a first table imager mounted in the chip tray and having a field-of-view extending outwardly from the sidewall.

9. The gaming table monitor of claim 8, further comprising:
    at least a second table imager mounted in the chip tray and having a field-of-view extending outwardly from the sidewall.

10. The gaming table monitor of claim 8, further comprising:
    a plurality of additional table imagers mounted in the chip tray, each of the table imagers having a respective field-of-view, the imagers positioned in the chip tray to provide at least an 180 degree accumulated field-of-view.

11. The gaming table monitor of claim 8 wherein the first imager is a complimentary-metal oxide semiconductor color sensor.

12. The gaming table monitor of claim 8, further comprising:
    eight additional imagers mounted in the chip tray, each of the imagers being a complimentary-metal oxide semiconductor color sensor having a respective field-of-view, the imagers positioned in the chip tray with partially overlapping fields-of-view to provide an approximately 180 degree accumulated field-of-view of the surface of the gaming table.

13. The gaming table monitor of claim 8 wherein the side wall includes a rear portion and front potion opposed to the rear portion, the front portion being taller than the rear portion with respect to the base, the front portion of the side wall including at least a first aperture, and wherein the field-of-view of the first imager is aligned with the first aperture.

14. The gaming table monitor of claim 8 wherein the side wall includes a rear portion and front potion opposed to the rear portion, the front portion being taller than the rear portion with respect to the base, the front portion of the side wall including at least a first aperture, and wherein the first imager is mounted in the first aperture.

15. A gaming table monitor, comprising:
   a chip tray having a base including a front portion, and a chip carrying surface supported by the base, the chip carrying surface including a number of wells sized to receive chips therein; and
   means for table imaging mounted in the chip tray and having a first table imaging field-of-view extending outwardly from the front portion of the base.

16. The gaming table monitor of claim 15, wherein the table imaging means includes a plurality of complimentary-metal oxide semiconductor color sensors positioned in the chip tray to have partially overlapping fields-of-view to provide an approximately 180 degree accumulated field-of-view of the surface of the gaming table.

17. The gaming table monitor of claim 15 wherein the imaging means includes a nine complimentary-metal oxide semiconductor color sensors positioned in the chip tray to have partially overlapping fields-of-view to provide an approximately 180 degree accumulated field-of-view of the surface of the gaming table.

18. The gaming table monitor of claim 15 wherein the imaging means has at least an 180 degree accumulated field-of-view of the playing surface of the gaming table.

* * * * *